US009286388B2

(12) United States Patent
Marsh

(10) Patent No.: US 9,286,388 B2
(45) Date of Patent: Mar. 15, 2016

(54) METHOD AND APPARATUS FOR CONTEXT-SPECIFIC CONTENT DELIVERY

(75) Inventor: Christopher Marsh, Reston, VA (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 1792 days.

(21) Appl. No.: 11/198,620

(22) Filed: Aug. 4, 2005

(65) Prior Publication Data

US 2007/0033531 A1 Feb. 8, 2007

(51) Int. Cl.
 *H04N 7/10* (2006.01)
 *H04N 7/025* (2006.01)
 *G06F 17/30* (2006.01)
 *G06Q 30/02* (2012.01)

(52) U.S. Cl.
 CPC .......... *G06F 17/30864* (2013.01); *G06Q 30/02* (2013.01)

(58) Field of Classification Search
 USPC ......................................................... 725/34
 See application file for complete search history.

(56) References Cited

U.S. PATENT DOCUMENTS

| | | | |
|---|---|---|---|
| 5,406,322 A | 4/1995 | Port et al. | |
| 6,084,628 A | 7/2000 | Sawyer | |
| 6,171,931 B1 * | 1/2001 | Murari et al. | 438/455 |
| 6,177,931 B1 * | 1/2001 | Alexander et al. | 725/52 |
| 6,311,194 B1 | 10/2001 | Sheth et al. | |
| 6,453,347 B1 | 9/2002 | Revashetti et al. | |
| 6,487,538 B1 | 11/2002 | Gupta et al. | |
| 6,513,052 B1 | 1/2003 | Binder | |
| 6,611,842 B1 | 8/2003 | Brown | |
| 6,615,175 B1 | 9/2003 | Gazdzinski | |
| 6,718,551 B1 | 4/2004 | Swix et al. | |
| 6,760,916 B2 * | 7/2004 | Holtz et al. | 725/34 |
| 6,771,290 B1 | 8/2004 | Hoyle | |
| 6,775,842 B1 | 8/2004 | Van Gestel | |
| 6,799,201 B1 | 9/2004 | Lee et al. | |
| 6,804,659 B1 | 10/2004 | Graham et al. | |
| 6,850,252 B1 | 2/2005 | Hoffberg | |
| 6,856,673 B1 | 2/2005 | Banks et al. | |
| 7,089,194 B1 | 8/2006 | Berstis | |
| 7,100,183 B2 | 8/2006 | Kunkel | |
| 7,181,415 B2 | 2/2007 | Blaser | |
| 7,257,589 B1 | 8/2007 | Hull | |
| 7,328,448 B2 | 2/2008 | Eldering | |
| 7,346,606 B2 | 3/2008 | Bharat | |
| 2002/0002512 A1 * | 1/2002 | Harpale | 705/26 |

(Continued)

*Primary Examiner* — Nasser Goodarzi
*Assistant Examiner* — Fred Peng
(74) *Attorney, Agent, or Firm* — Gazdzinski & Associates, PC

(57) ABSTRACT

Methods and apparatus for generating and delivering selected primary content and contextually-related, targeted secondary content to users of a network. In an exemplary embodiment, the network comprises a packet-switched data (e.g., IP) network such as the Internet, and the primary content comprises video or media clips that are user-selectable via a network site or web page. The primary content carries with it descriptive metadata that is accessed by a distribution server and forwarded to a secondary content source. The secondary content source (or its proxy) utilizes the metadata to identify and return contextually-related secondary content such as advertising links. This secondary content is then presented to the user in conjunction with the primary content, such as in a common display window and in a seamless fashion, thereby avoiding distractions to the user associated with generating ancillary windows or other display mechanisms, and providing the user with highly relevant secondary content choices.

6 Claims, 11 Drawing Sheets

(56) References Cited

U.S. PATENT DOCUMENTS

| | | |
|---|---|---|
| 2003/0101451 A1 | 5/2003 | Bentolila et al. |
| 2003/0191689 A1 | 10/2003 | Bosarge et al. |
| 2003/0217365 A1 | 11/2003 | Caputo |
| 2004/0128688 A1* | 7/2004 | Seo .................................. 725/62 |
| 2004/0158858 A1* | 8/2004 | Paxton et al. .................... 725/42 |
| 2004/0186777 A1 | 9/2004 | Margiloff et al. |
| 2004/0194141 A1* | 9/2004 | Sanders ........................... 725/53 |
| 2005/0055685 A1 | 3/2005 | Maynard |
| 2005/0080775 A1 | 4/2005 | Colledge et al. |
| 2006/0224447 A1* | 10/2006 | Koningstein .................... 705/14 |
| 2006/0230457 A1* | 10/2006 | Hagan et al. .................... 726/26 |
| 2006/0293921 A1* | 12/2006 | McCarthy et al. ................ 705/2 |
| 2007/0022459 A1 | 1/2007 | Gaebel |
| 2007/0276801 A1* | 11/2007 | Lawrence et al. ................. 707/3 |
| 2010/0070510 A1* | 3/2010 | Agarwal et al. ............... 707/748 |

\* cited by examiner

META DATA

```
<headline>
<![CDATA[High Court Split over
Ten Commandment Displays]]>
</headline>
<previewText>
<![CDATA[A sharply divided
Supreme Court on Monday upheld
the constitutionality of displaying
the Ten Commandments on
government land, but drew the line
on displays inside courthouses.]]>
</previewText>
```

FIG. 3a

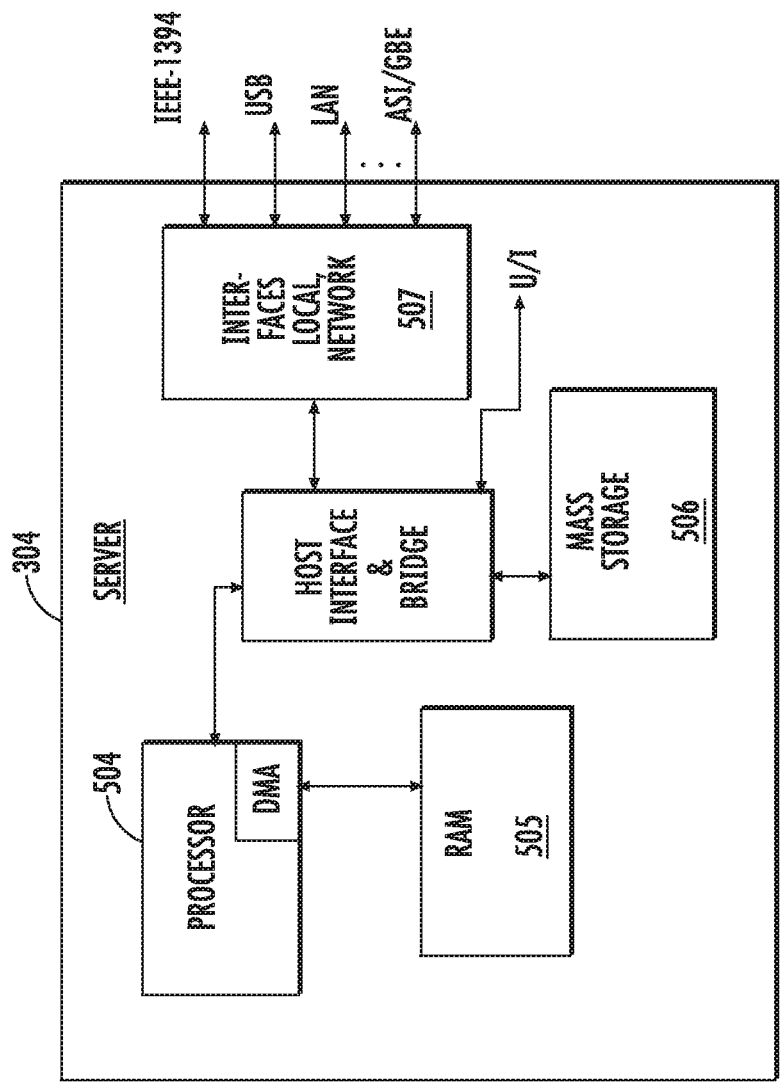

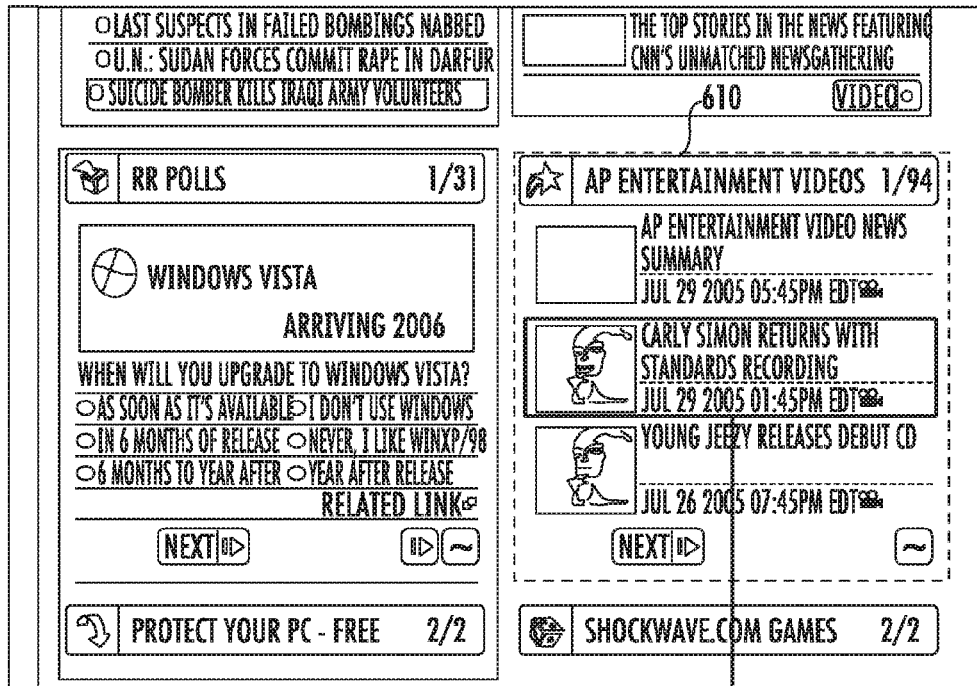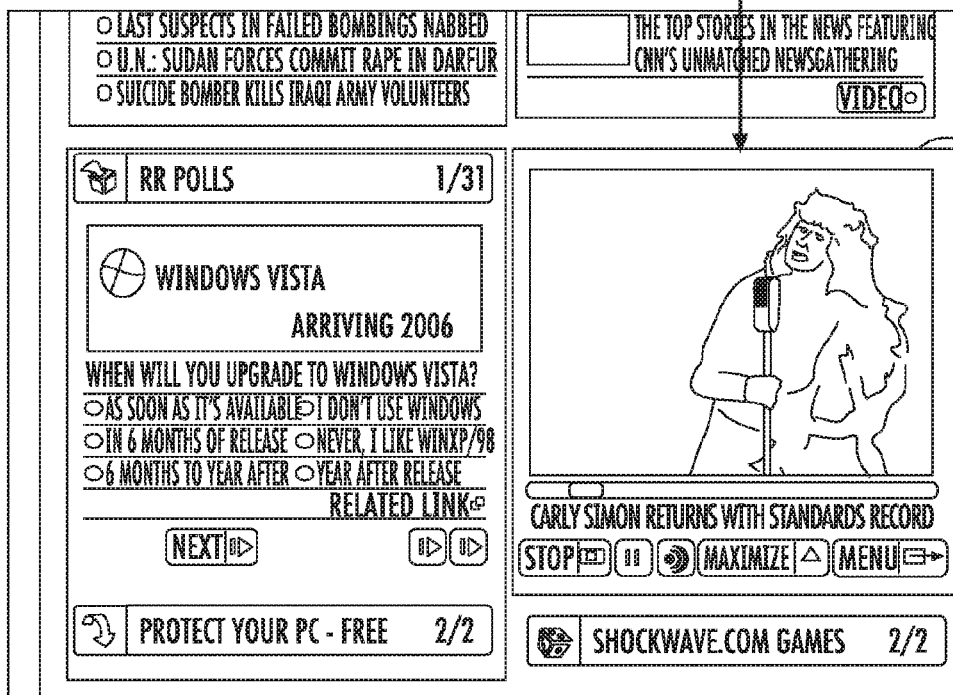
FIG. 6c

CHANNEL ID SUMMARY REPORT FOR CLIENT ID ca-aol_rr_xml (June 1 - July 15, 2005) 704

BACK TO CLIENT ID SUMMARY  CHANNEL ID SUMMARY  VIEW WITH SPAM  VIEW BY PAGE  OPEN IN EXCEL (TAB DELIMITED)

| CHANNEL | QUERIES | MATCHED QUERIES | COVERAGE | IMPRESSIONS | CLICKS | CTR | CPC | ESTIMATED GROSS REVENUE | RPM |
|---|---|---|---|---|---|---|---|---|---|
| articlenews | 7,015,479 | 6,749,534 | 96.209% | 21,241,967 | 165,705 | 2.455% | $0.209 | $34,745.64 | $4.93 |
| maps | 1,073 | 1,059 | 98.695% | 7,754 | 405 | 38.243% | $0.262 | $106.50 | $99.25 |
| podquote | 962,532 | 962,526 | 99.999% | 2,882,880 | 6,348 | 0.659% | $1.227 | $7,794.91 | $8.10 |
| stockpod | 0 | 0 | 0.000% | 0 | 0 | 0.000% | $0.000 | $0.00 | $.00 |
| videonews | 486,182 | 457,264 | 94.052% | 1,350,998 | 24,641 | 5.388% | $0.180 | $4,438.19 | $2.13 |
| TOTALS | 8,465,266 | 8,170,383 | | 25,483,599 | 197,099 | | | $47,084.83 | |

FIG. 7

METHOD AND APPARATUS FOR CONTEXT-SPECIFIC CONTENT DELIVERY

BACKGROUND OF THE INVENTION

1. Field of Invention

The present invention relates generally to the field of network service and content delivery, and specifically in one aspect to delivering contextually related groups of content to network users.

2. Description of Related Technology

In the context of network services, it is often highly desirable to provide users of the network with ready and instant access to a variety of different types of content, such as audio or video clips, news stories, instructional materials, etc. In many cases, it is also desirable to provide the same user with "secondary" content which is related to the "primary" content which the user selected in the first place. Myriad different reasons for providing such related secondary content exist, including inter alia, (i) to increase advertising effectiveness, revenue and product sales (i.e., commerce-related), (ii) to provide additional sources of information that the user can follow up on if interested, and (iii) to make the user aware of corresponding events or occurrences that they may not be otherwise aware of, without having to take the affirmative action of looking for them.

One of the difficulties associated with providing such primary and related secondary content is the task of determining the scope of secondary material to provide. If the user is inundated with a flood of secondary material, they are often less likely to utilize it, since it requires a significant investment in time to navigate through the material to identify items of interest. Conversely, if too few or irrelevant secondary materials links are provided, the user will be unlikely to utilize them since they view them as having little utility. Hence, a balance is optimally struck, ideally by providing the user with a limited number of highly relevant secondary materials or links thereto. This is especially critical where the display area size, available time frame, and so forth are very limited, such as on an Internet web page devoted to multiple different topics and media.

In addition to the relevance and volume of secondary information, the display paradigm used to convey this information to the user must be considered. For example, the now ubiquitous "pop up" window on the Internet is a mechanism whereby a user visiting a given URL or website link may invoke the spawning of a separate window (e.g., using Javascript or the like) on the user's display. As most will attest, however, these pop-up windows are often quite annoying and distracting to the computer user, from a number of perspectives. First, they cause a new process to be created, thereby reducing CPU efficiency (i.e., make the user's computer run more slowly). This is especially true where the computer or other such device already has several applications/processes/threads running.

Second, they are a distraction to the user, since whether minimized or not, visual changes to the user's display occur. Realignment/shifting of the user's browser display bars also may occur when the new window opens, thereby further distracting the user, even if only momentarily.

Third, these windows may contain links to e.g., surreptitious sites who will download spyware or other such malicious content to the user's computer if the user activates the link, even by mistake.

Additionally, these windows will remain active until affirmatively closed by the user.

Also well known in the prior art are context-specific "banner" advertisements, which generally are disposed in designated regions of the upper, lower, or side portions of the user's display. These advertisements are often context-sensitive from the standpoint that their content is selected based on either the user's selection of hyperlinks, or one or more search terms used by the user in a search engine.

Further known in the prior art is the Internet content (e.g., radio) advertisement, which typically runs before the "primary" content (in this case, the digitized audio stream from an Internet radio provider), within the media player application window. For example, when one opens their Windows™ Media Player application and selects an Internet radio station, many such stations will cause a short audio-visual advertisement or promotion to be loaded and played before the primary content audio stream starts playing. However, such secondary (advertising) content is not in any way related to the context of the primary content, and cannot be controlled or selected by the user.

A number of other approaches to secondary content delivery (including delivery of related advertising) over networks are evidenced prior art. For example, U.S. Pat. No. 6,084,628 to Sawyer issued Jul. 4, 2000 entitled "System and method of providing targeted advertising during video telephone calls" discloses a system in a telecommunications network for providing targeted advertising to subscribers utilizing display screens to conduct a video telephone call. The system comprises a centralized database of subscriber advertising preferences, an information source, a calling subscriber's switch connected to the database and the information source, and a called subscriber's switch connected to the calling subscriber's switch. The database of subscriber advertising preferences stores advertising preferences for subscribers in the network, and is updated whenever a subscriber selects a displayed advertisement for more information. The information source stores a plurality of advertisements, and includes an advertisement selector which selects advertisements based on the advertising preferences for an identified subscriber such as the calling subscriber. The calling subscriber's switch retrieves the advertising preferences for the calling subscriber from the database and sends the preferences to the information source. The switch then retrieves the selected advertisements from the information source and generates a window on the calling subscriber's display screen which displays the retrieved advertisements. The retrieved advertisements are also sent to the called subscriber's switch for simultaneous display to the called subscriber.

U.S. Pat. No. 6,311,194 to Sheth, et al. issued Oct. 30, 2001 entitled "System and method for creating a semantic web and its applications in browsing, searching, profiling, personalization and advertising" discloses a system and method for creating a database of metadata (metabase) of a variety of digital media content, including TV and radio content delivered on Internet. This semantic-based method captures and enhances domain or subject specific metadata of digital media content, including the specific meaning and intended use of original content. To support semantics, a WorldModel is provided that includes specific domain knowledge, ontologies as well as a set of rules relevant to the original content. The metabase may also be dynamic in that it may track changes to the any variety of accessible content including live and archival TV and radio programming. Targeted advertising involves creating an XML string that represents queries that the user performs or individual media assets in which the user has an interest. This XML string is sent to an external advertisement provider along with a user's session and profile information.

U.S. Pat. No. 6,453,347 to Revashetti, et al. issued Sep. 17, 2002 entitled "Active marketing based on client computer configurations" discloses a system and method for actively marketing products and services to a user of a client computer such as over a network. A product information database comprising product summary files that facilitate determination of presence or absence of products associated with the client computer, a marketing rule knowledge base comprising opportunity rule files governing marketing opportunities, and an opportunity detection object for determination of marketing opportunities are utilized to determine active marketing opportunities and may be downloaded to the client computer from a service provider computer system. The opportunity detection object may comprise a scan engine, an opportunity analysis engine, and a presentation engine which collectively determine and present marketing information to the client computer user. The scan engine compares the client computer against the product information database to determine the configurations of the client computer and to generate a client computer inventory database. The opportunity analysis engine analyzes the client computer inventory database against the marketing rule knowledge base and generates a list of marketing opportunities for the client computer. The presentation engine analyzes the list of marketing opportunities and provides marketing and/or other information regarding marketed products to the user.

U.S. Pat. No. 6,487,538 to Gupta, et al. issued Nov. 26, 2002 entitled "Method and apparatus for local advertising" discloses a method and apparatus for local advertising. Internet Service Providers (ISPs) or proxies owned by an ISP insert advertisements transmitted from a web host to a client. The advertisement may be stored in the proxy's cache or may be retrieved from a web server for an advertiser. By providing the ISP with the ability to insert the advertisement, advertisements appear on small web sites that do not normally attract advertisers. Additionally, due to the number of advertisements placed by an ISP, small advertisers may have their advertisement appear in connection with frequently used web sites. One or more embodiments of the invention provide for an ISP to collect and store demographic information such as the user's age, residence, credit history, etc. Additionally, stored information may include web sites the user has accessed, time spent on each web site, and any searches performed by the user. The profile information may be utilized by the proxy to conduct targeted advertising and to associate a cost with certain demographic information. The profile information may be evaluated by the ISP for advertisement insertion. Alternatively, the profile information may be forwarded to an advertiser or advertising agency that evaluates and forwards back an advertisement for the proxy to transmit to the user.

U.S. Pat. No. 6,513,052 to Binder issued Jan. 28, 2003 entitled "Targeted advertising over global computer networks" discloses a method and system for presenting targeted advertising during an Internet-based connection, such as a web-based data backup session in which data is communicated from a user computer to a remote storage area for archival via the Internet. The user computer is communicatively coupled to the server via a computer network and an asset profile for the computer is generated. The asset profile identifies the software applications that are currently loaded on the computer and the current hardware configuration for the computer including a processor type and connected hardware devices. In addition, the asset profile contains usage information such as a frequency of use for the various software applications. As a function of the uploaded asset profile, advertisements are selected from an advertisement database and are communicated to the computer for display to the user. Because of the detailed asset information, targeted advertising information having correlation to the user's computing behavior can be selected and displayed.

U.S. Pat. No. 6,611,842 to Brown issued Aug. 26, 2003 entitled "Method and apparatus for generating profile data" discloses a computer system that includes a database storing user histories of selected products, and a database associating products with assessments of their content in a number of different categories. The computer system generates user profile data reflecting the underlying characteristics of user preferences by identifying categories and groups of categories corresponding to products in the user histories whose content assessments are one of an extremely high and low evaluation. In the user profile data, larger groups of categories having extremely high or low content evaluations are weighted more heavily than smaller groups of categories and singly identified categories having extremely high or low content evaluations. The generated user profile data can be utilized to provide targeted advertising and/or to automatically select products are identified with similar underlying characteristics of the user preferences.

U.S. Pat. No. 6,615,175 to Gazdzinski issued Sep. 2, 2003 entitled ""Smart" elevator system and method" discloses a speech recognition and analysis system for providing contextually-related information to, inter alia, the passengers of an elevator car. Speech (and optionally other user inputs) are sampled to determine their context, and advertising or other contextually related information displayed to the user on an in-car display, and/or output to their personal electronic device (PED).

U.S. Pat. No. 6,718,551 to Swix, et al. issued Apr. 6, 2004 entitled "Method and system for providing targeted advertisements" discloses a method and system for providing targeted advertisements over a networked media delivery system, especially interactive television networks. The invention comprises tracking and storing viewer selections, analyzing the selections, and delivering targeted advertisements that appeal to the particular subscriber making the selections, the system including a merge processor, a file server, a profile processor, and a broadcast server contained in a head end in communication with a plurality of set-top boxes through a distribution network. Based on a subscriber's viewing habits and account information, the present invention delivers different, customized advertisements to different viewers watching the same program or channel. The present invention delivers the advertisements as either still frame bit maps or as video streams advertisement insertion in a playlist or a broadcast media program.

U.S. Pat. No. 6,771,290 to Hoyle issued Aug. 3, 2004 entitled "Computer interface method and apparatus with portable network organization system and targeted advertising" discloses a method and apparatus for providing an automatically upgradeable software application that includes targeted advertising based upon demographics and user interaction with the computer. The software application includes a display region used for banner advertising that is downloaded over a network such as the Internet. The software application is accessible from a server via the network and demographic information on the user is acquired by the server and used for determining what advertising will be sent to the user. The software application further targets the advertisements in response to normal user interaction with the computer. Data associated with each advertisement is used by the software application in determining when a particular advertisement is to be displayed. This includes the specification of certain programs that the user may have so that, when the user runs the program (e.g., a spreadsheet program), a relevant advertisement will be displayed (e.g., an advertisement for a stock brokerage). This provides two-tiered targeting of advertising; both demographically and reactively.

U.S. Pat. No. 6,775,842 to Van Gestel issued Aug. 10, 2004 entitled "Method and arrangement for transmitting and receiving encoded images" discloses TeleWeb services in which HTML-encoded images are transmitted in the vertical blanking interval of a conventional analog television signal. For special applications, such as subtitling and targeted advertising, the relevant TeleWeb images must be displayed substantially in synchronism with given video frames of the television signal. This is achieved by transmitting the encoded images in advance and provide them with a time stamp which specifies the display time in terms of a reference clock. The reference clock is preferably derived from the teletext clock time. A possible display time stamp format is hh:mm:ss'ff, where ff specifies a frame within a second. At the receiver end, the teletext clock is interpolated to reconstruct the reference clock, and the subtitles are buffered until the display time stamp matches the actual clock time.

U.S. Pat. No. 6,799,201 to Lee, et al. issued Sep. 28, 2004 entitled "Remotely configurable multimedia entertainment and information system for vehicles" discloses an internet radio for portable applications and uses such as in an automobile. The internet radio allows access to audio, visual and other information. Normal radio channel function is provided along with programmable content and channel selection, as well as automatic content and channel updating by location and style. Internet access is also provided. Direct or targeted advertising, as well as electronic commerce is supported. Connection to the internet is through wireless communications. Programmability is achieved off-line via a web page and remote computer. Customized information is also communicated to the radio such as stock quotes, travel information, advertising, and e-mail. Onboard global positioning allows for channel updating by location, traffic information, geographic advertising and available similar content. User profile databases contain information about the user's system preferences (e.g., channels selected), billing information and a purchasing interest profile. Information in advertising databases can be compared against a user's purchasing interest profile through an adaptive profiler so that advertisements inserted into delayed personalized digital broadcasts mesh with that individual's buying interests.

U.S. Pat. No. 6,804,659 to Graham, et al. Oct. 12, 2004 entitled "Content based web advertising" discloses an internet target marketing system, method and computer program for distributing online advertising to viewers based upon the viewers' interests. Specific embodiments can use an n-way matching of user's concepts of interest, advertiser's concepts and a currently viewed document to target advertising to the view of the current document. Some embodiments can generate a contextually sensitive advertisement for each page viewed in a browser, thereby associating an advertisement with every page in a document. Specific embodiments can associate advertising with documents that are substantially free of embedded advertisements, for example. Alternative embodiments can include embedded advertising, however.

U.S. Pat. No. 6,850,252 to Hoffberg issued Feb. 1, 2005 entitled "Intelligent electronic appliance system and method" discloses an electronic appliance including a user interface, data input and/or output port, and an intelligent processor. A preferred embodiment comprises a set top box for interacting with broadband media streams, with an adaptive user interface, content-based media processing and/or media metadata processing, and telecommunications integration. An adaptive user interface models the user, by observation, feedback, and/or explicit input, and presents a user interface and/or executes functions based on the user model. A content-based media processing system analyzes media content, for example audio and video, to understand the content, for example to generate content-descriptive metadata. A media metadata processing system operates on locally or remotely generated metadata to process the media in accordance with the metadata, which may be, for example, an electronic program guide, MPEG 7 data, and/or automatically generated format. A set top box preferably includes digital trick play effects, and incorporated digital rights management features. Some selective targeting of particular audiences is also disclosed.

U.S. Pat. No. 6,856,673 to Banks, et al. issued Feb. 15, 2005 entitled "Targeted advertising in a telephone dialing system" discloses a system and method for providing targeted advertising to telephone callers in mid-dial. The invention monitors the dialing activities of a caller. When a caller enters a partial desired telephone number, an embodiment of the invention receives the partial number and determines whether an advertisement should be presented to the caller. If all of the appropriate conditions are met, a selected advertisement is transmitted to the caller's telephony device and the caller is given the opportunity to respond to the advertisement before the dialing operation completes.

U.S. Patent Application Publication No. 20030101451 to Bentolila, et al. published May 29, 2003 entitled "System, method, and software application for targeted advertising via behavioral model clustering, and preference programming based on behavioral model clusters" discloses a method and system for TV user profile data prediction and modeling that allows behavioral clustering. A client-side system classifies television consumers into representative user profiles. The profiles target individual user advertising and program preference category groups. A contextual behavioral profiling system determines the user's monitor behavior and content preferences, and the system may be continually updated with user information. A behavioral model database is queried by various system modules. The programming, including targeted advertising for television and interactive television is based on the profile data prediction, modeling and preference determination. The system is enabled to present a program sequence to the viewer based on the preference determination and stored programming. The latter is referred to as automatic program sequence (virtual channel) creation and the virtual channel can be presented as a separate channel in an electronic programming guide (EPG).

U.S. Patent Application Publication No. 20030191689 to Bosarge, et al. published Oct. 9, 2003 entitled "Method and apparatus for adding advertising tag lines to electronic messages" discloses a computerized method and device for intercepting contracting client's sent electronic messages, scanning the message body content for key words, sending the key words to a remote central computer server which analyses the key words and enhances the message by attaching a relevant, contextual advertising tag line or image/banner/words/ HTML/Flash, etc to the electronic message, and transmitting the enhanced message to a receiver.

U.S. Patent Application Publication No. 20040186777 to Margiloff, et al. published Sep. 23, 2004 entitled "Systems and methods for providing contextual advertising information via a communication network" discloses systems and methods to display contextual advertising information to a user via a communication network. In some embodiments, an advertising rule may be directed to providing a user with contextual advertising information. For example, an advertisement for tire repair or other tire-related information may be provided to the user in response to the user's search for "tires".

U.S. Patent Application Publication No. 20050080775 to Colledge, et al. published Apr. 14, 2005 entitled "System and method for associating documents with contextual advertisements" discloses a system and method of associating results from a query from a user directed to a search engine to advertisements associated with the search engine. In the method, there are the steps of: obtaining advertisement keyword "senses" associated with the advertisements; disambiguating the query to identify query keyword senses associated with the query; expanding the query keyword senses to include relevant semantic synonyms for the query keyword senses to create a list of expanded query keyword senses; using the expanded keyword senses to search the advertisement keyword senses to locate relevant advertisements correlating to the query; and providing the relevant advertisements to the user. The system incorporates modules conducting steps of the method.

Despite the foregoing broad variety of techniques for providing various types of content (including advertising) to users of a network, each suffer from various disabilities including: (i) proving secondary content which is unrelated or only marginally related to the primary content; (ii) providing too many forms or instances of secondary content, thereby overwhelming the user; (iii) providing secondary content via a separate display element (e.g., pop-up window or banner) which is distracting and breaks the continuity of the user's visual experience; and (iv) lack of applicability to various types of networks and transport mechanisms (i.e., network agnostic).

Hence, it would be highly desirable to provide a solution to displaying or otherwise providing secondary content (such as, e.g., advertising) which is closely related to the subject matter of the primary content, yet which does not cause any perceptible annoyances or detriments to the user's on-line or viewing experience, yet which effectively and prominently makes such secondary content available to the user. Such an improved approach would ideally (i) provide a seamless and integrated display experience, (ii) return a limited number of the most relevant results, so as to further enhance the user's experience, and (iii) be substantially network agnostic so that it could be adapted to various different types of network topologies, infrastructures, transport mechanisms, and programming environments. Such improved solution would also be amenable to control for business and/or operational reasons.

SUMMARY OF THE INVENTION

The present invention satisfies the foregoing needs by providing improved apparatus and methods for context-specific content delivery and display, such as may be used for example in a data, cable or satellite network.

In a first aspect of the invention, a method of providing primary content and contextually-related secondary content to users of a network is disclosed. In one embodiment, the network comprises a packetized data network with a server and a client device in data communication therewith, and the method comprises: receiving at the server from the client device a request for the primary content for download; accessing, in response to the act of receiving, a metadata file associated with the primary content in order to obtain metadata therefrom; providing the metadata obtained from the file to a search entity for a search based at least partly on the metadata, the search producing the contextually related secondary content; receiving the secondary content from the search entity; associating at least a portion of the secondary content and the primary content; transmitting the primary content to the client device, and the secondary content to the client device; and displaying the primary and secondary content using the client device. In one variant, the primary and secondary content are displayed in a common display element (e.g., window) in a substantially sequential and contiguous fashion, so as to avoid breaking or disrupting the viewer's attention. The primary content comprises, e.g., an audio-visual medium, and the secondary content comprises substantially textual advertising data (e.g., links to advertiser websites).

In another embodiment, the network comprises a content-based network selected from the group consisting of (i) a cable television network, and (ii) a satellite network, and the client device comprises consumer premises equipment (CPE) adapted to receive the primary and secondary content via radio frequency (RF) signals transmitted to the CPE over the network.

In a second aspect of the invention, a storage apparatus is disclosed. In one embodiment, the apparatus comprises a storage medium, the medium being adapted to store a plurality of data thereon, the data comprising at least one computer program, the at least one computer program being adapted to run on a computerized device and further to: receive a request for primary content from a client device in data communication with the computerized device; access the primary content; access a metadata file associated with the primary content; provide at least a portion of the metadata to a search entity in data communication with the computerized device; receive results of a search conducted by the entity based at least in part on the metadata; couple at least a portion of the results to the primary content; and transmit the primary content and the secondary content to the client device. In one variant, the computerized device comprises a data network server and the client device comprises a computer program adapted for playing the primary and secondary content within a window generated on a display of the client device.

In another variant, the computerized device comprises a cable network server and the client device comprises consumer premises equipment (CPE) having a computer program adapted for playing the primary and secondary content within a window generated on a display in data communication with the CPE.

In a third aspect of the invention, a method of providing primary content and contextually-related secondary content to users of a network is disclosed. In one embodiment, the network comprises a content-based network having a server and a consumer premises device in data communication therewith, and the method comprises: receiving at the server from the consumer premises device a request for the primary content for transmission or download; accessing, in response to the act of receiving, a descriptive data file associated with the primary content in order to obtain descriptive data therefrom, the descriptive data relating to at least one aspect of the primary content; providing the descriptive data to a search entity for a search, the search producing the contextually related secondary content; transmitting the primary and secondary content to the consumer premises device over at least a radio-frequency medium; and displaying the primary and secondary content on a display device associated with the consumer premises device. In one variant, the act of transmitting comprises: disposing the primary and secondary content within a common data structure; and transmitting the common data structure to the consumer premises device. In another variant, the network comprises a cable television network capable of video-on demand (VOD) delivery of content, and the act of transmitting comprises transmitting as part of a VOD session.

In another embodiment, the storage apparatus comprises at least one computer program adapted to run on a computerized device and further to: issue a request for primary content to a server device in data communication with the computerized device; receive the primary content from the server, the primary content further comprising secondary content, the secondary content being selected based at least in part on metadata associated with the primary content, the metadata being extracted by the server and provided to a search entity to identify the secondary content; and play the primary and secondary content within the same window generated on a display at least associated with the computerized device.

In a fourth aspect of the invention, consumer premises equipment (CPE) adapted for use within a cable network id disclosed. In one embodiment, the CPE comprises: an interface configured to receive encoded content signals from the network; processing apparatus operatively coupled to the interface and adapted to decode the encoded signals received via the interface; and at least one computer program running on the CPE, the at least one program being adapted to: issue a request for primary content to a server device in data communication with the CPE over the network; receive the primary content from the server, the primary content further comprising secondary content, the secondary content being selected based at least in part on metadata associated with the primary content, the metadata being extracted by the server and provided to a search entity to identify the secondary content; and play the primary and secondary content in a substantially contiguous fashion and within the same window generated on a display in communication with the CPE.

In a fifth aspect of the invention, network server apparatus for use in a network having a plurality of client devices in data communication therewith is disclosed. In one embodiment, the apparatus comprises: a processor adapted to run at least one computer program thereon; a storage device in data communication with the processor; and a computer program stored at least partially on the storage device and adapted to distribute primary content and contextually-related secondary content to users of the network by: receiving at the server from at least one of the client devices a request for the primary content for transmission or download; accessing, in response to the act of receiving, a descriptive data file associated with the primary content in order to obtain descriptive data therefrom, the descriptive data relating to at least one context of the primary content; providing the descriptive data to a search entity for a search, the search producing the contextually related secondary content; transmitting the primary and secondary content to the at least one client device; and displaying the primary and secondary content on a display device associated with the at least one client device.

In one embodiment, the computer program is adapted to perform at least one of (i) modifying the descriptive data, and (ii) modifying the contextually related secondary data, based at least in part on profiling data obtained from the at least one client device. The profiling data comprises at least one cryptographically hashed portion, the at least one hashed portion substantially maintaining the anonymity of the at least one client device.

In a sixth aspect of the invention, a method of selectively providing primary and secondary content to a plurality of subscribers of a network is disclosed. In one embodiment, the network comprises at least one server and a plurality of client devices in direct or indirect signal communication therewith, and the method comprises: providing each of the client devices with an identifying parameter; receiving a request for the primary content from at least one of the client devices, the request comprising at least the identifying parameter for the requesting device; identifying secondary content that is contextually related with the primary content, the act of identifying being based at least in part on information accessed via the identifying parameter of the requesting device; and delivering the primary and secondary content to the at least one requesting client device.

In another variant, the method further substantially preserves the anonymity of the at least one client device by: cryptographically hashing the identifying parameter; and indexing the information based on the cryptographically hashed parameter.

In a seventh aspect of the invention, a method of doing business within a network is disclosed. In one embodiment, the network comprises at least one server and a plurality of client devices in direct or indirect signal communication therewith, and the method comprises: providing users of the client devices with a plurality of primary content choices; receiving selections by the users relating to individual ones of the primary content choices; evaluating the selected primary content to identify descriptive information associated therewith; utilizing the descriptive information to identify contextually related secondary content within a revenue-based content source; associating the secondary content with the primary content; delivering the primary and secondary content to the selecting users; and allowing the users to interact with the secondary content, the interaction comprising an event that directly or indirectly produces revenue. In one variant, the descriptive information comprises metadata, and the revenue-based content source comprises an advertisement database with associated search engine, the search engine being adapted to utilize the metadata to identify the secondary content.

BRIEF DESCRIPTION OF THE DRAWINGS

FIG. 3a is a graphical representation of an exemplary embodiment of a metadata file associated with the primary content of the invention.

FIG. 5 is a functional block diagram illustrating an exemplary network distribution server device according to the invention.

FIG. 6c is a graphical representation of the exemplary placement of the display window of FIGS. 6a and 6b within an existing web page HTML/XML frame structure, both before and after selection of a primary content link.

FIG. 7 is a graphical illustration of exemplary anecdotal performance data for the present invention, showing the significant improvements in performance provided thereby.

DETAILED DESCRIPTION OF THE INVENTION

Figure 1:
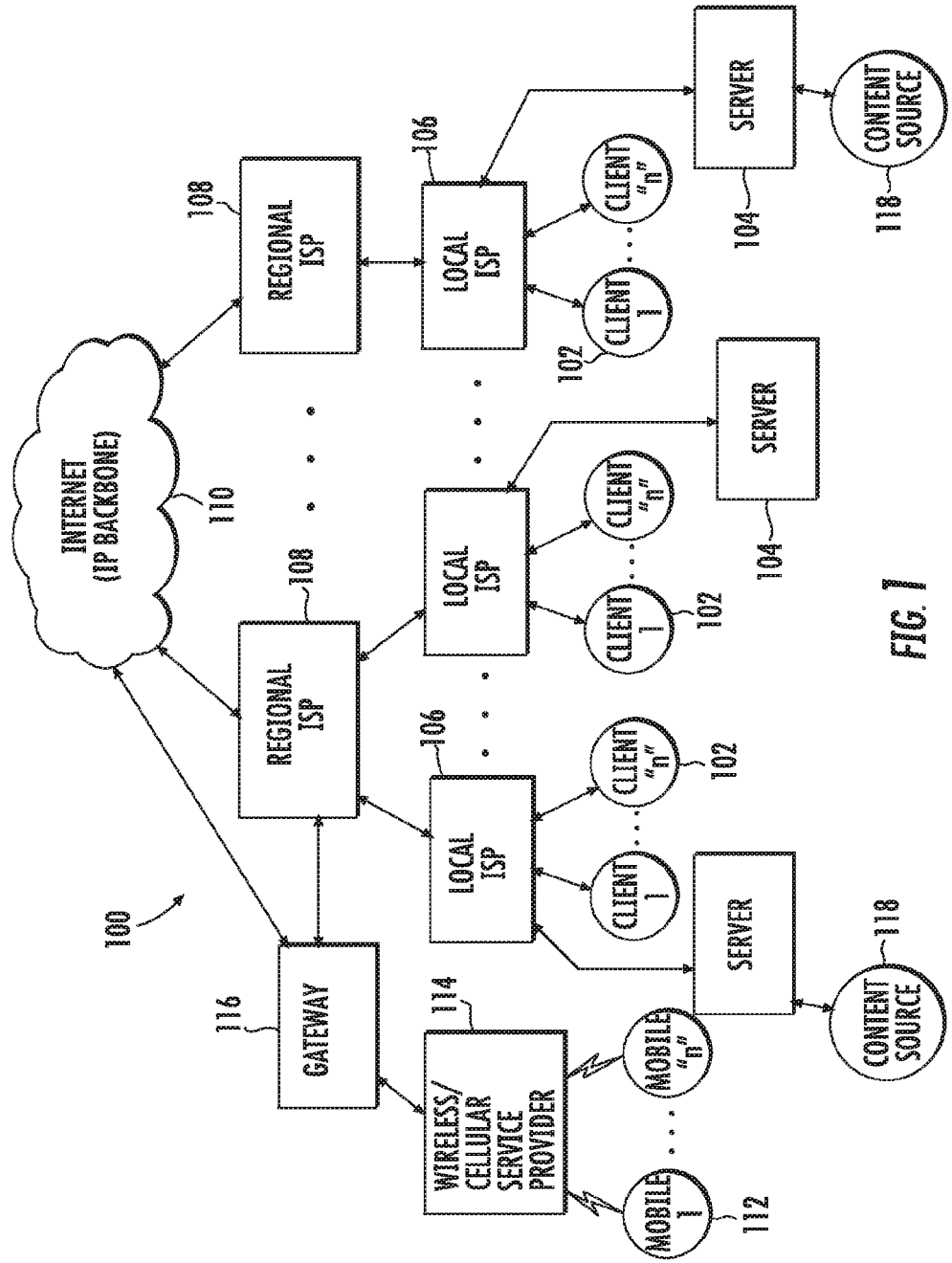
FIG. 1 is a functional block diagram illustrating an exemplary data network configuration useful with the present invention.

Reference is now made to the drawings wherein like numerals refer to like parts throughout.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of network (e.g., telecommunications, content or data) including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, TCP/IP, UDP, FTP, RTP/RTCP, H.323, etc.).

As used herein, the term "head-end" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional head-ends may be in the same or different cities.

As used herein, the terms "client device" and "end user device" include, but are not limited to, personal computers (PCs) and minicomputers, whether desktop, laptop, or otherwise, set-top boxes such as the Motorola DCT2XXX/5XXX and Scientific Atlanta Explorer 2XXX/3XXX/4XXX/6XXX/8XXX series digital devices, personal digital assistants (PDAs) such as the Apple Newton®, "Palm®" family of devices, handheld computers, personal communicators such as the Motorola Accompli or V7.10, J2ME equipped devices, cellular telephones, wireless nodes, or literally any other device capable of interchanging data with a network.

Similarly, the terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes, televisions, Digital Video Recorders (DVR), gateway storage devices (Furnace), and ITV Personal Computers.

As used herein, the term "network agent" refers to any network entity (whether software, firmware, and/or hardware based) adapted to perform one or more specific purposes. For example, a network agent may comprise a computer program running in server belonging to a network operator, which is in communication with one or more processes on a CPE or other device.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "computer program" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VOXML), and the like, as well as object-oriented environments such as the Common Object Request Broker Architecture (CORBA), Java™ (including J2ME, Java Beans, etc.) and the like.

The term "component" in the context of software refers generally to a unit or portion of executable software that is based on a related set of functionalities. For example, a component could be a single class in Java™ or C++. Similarly, the term "module" refers generally to a loosely coupled yet functionally related set of components.

As used herein, the term "server" refers to any computerized component, system or entity regardless of form which is adapted to provide data, files, applications, content, or other services to one or more other devices or entities on a computer network.

As used herein, the term "content" refers to any form or information that is delivered via a designated medium. Content may include, without limitation, video, audio, and/or audiovisual data, text rendered in ASCII or one or more formatted languages (e.g., XML, HTML, SGML, etc.), computer programs or applications, files, or security-related or encryption data, or combinations of the foregoing. The content may have one or more contexts or themes, including without limitation informational, music-related, news, sports, weather, finance, business, entertainment, gaming, scientific, etc. It may also comprise promotional or similar themes, such as trailers for upcoming features, events or movies.

As used herein, the term "search engine" refers generally to any information or database search tool including, without limitation, web crawlers and directory-based systems, as well as user-rated or ranked systems. Such search tools may be fully or partly automated, and may also receive inputs from one or more individuals or other engines/tools/databases.

Overview

The present invention comprises, inter alia, methods and apparatus for providing contextually-related "secondary" content (e.g., advertising messages, useful informational links, etc.) in association with other primary content selected by the user. In one exemplary embodiment, the primary content comprises video clips or segments viewed by users of a network (e.g., Internet), and the secondary content comprises advertising selected at least in part based on metadata associated with the primary content. The metadata is provided by, e.g., the content originator or network operator, and is sent to a third party network entity (e.g., advertising server) which returns contextually specific advertising matching the search terms. In one variant, the search term is simply one or more keywords drawn from the metadata and used as an input to a search engine. In another variant, more sophisticated analysis of the metadata is performed so as to ostensibly reduce the number of irrelevant or marginally relevant "hits" returned by the search engine/advertising server In one salient aspect, the invention further improves over prior art network access and advertising techniques by providing a seamless visual integration/transition from the primary content to the secondary content. In one embodiment, instead of placing the returned secondary content (e.g., advertising) in an ancillary position around the primary content (e.g., video player window), the secondary content is placed within the display context of the primary content itself. The two different contents (e.g., encoded video & XML advertising) further are configured to appear as a single, integrated and seamless visual experience. This approach increases user satisfaction in a number of ways, and as indicated by anecdotal evidence, increases the effectiveness of the parent network site and secondary advertising content, thereby increasing revenue.

In another embodiment, the primary and secondary content are delivered over a content-based (versus purely data) network such as a cable television or satellite network. In one variant, the network comprises an MSO-based hybrid fiber coax (HFC) having a head end, DWDM optical distribution, a plurality of hubs and a plurality of subscriber CPE (consumer premises equipment)

Detailed Description of Exemplary Embodiments

Exemplary embodiments of the apparatus and methods of the present invention are now described in detail. While these exemplary embodiments are described in the context of either a data network (e.g., IP-based internet such as the Internet) or the aforementioned hybrid fiber coax (HFC) cable architecture having an multiple systems operator (MSO), digital networking capability, and plurality of client devices/CPE, the general principles and advantages of the invention may be extended to other types of networks and architectures where it is desired to deliver primary content and associated secondary content that is contextually related thereto. Such other networks or architectures may be broadband, wired or wireless, content or data, or otherwise. Hence, the following description is merely exemplary in nature. For example, the invention may be practiced within a dedicated LAN/WAN/intranet of an enterprise, such as where it is desired to present the user viewing primary content (such as an instructional video) with related secondary content (e.g., links to other useful materials or videos) that are contextually related to the selected primary content.

It will also be appreciated that while described generally in the context of a network providing service to a customer or consumer (i.e., residential) end user domain, the present invention may be readily adapted to other types of environments including, e.g., government/military or non-profit applications. Myriad other applications are possible.

Network and Software Architectures—

FIG. 1 illustrates a high-level diagram of a typical data network configuration (here, an exemplary internet comprising the Internet) with which the context-specific content delivery and presentation methodologies of the present invention may be used. In the illustrated embodiment, the network 100 comprises a packet-switched network with a plurality of client devices 102, a plurality of servers 104, and a plurality of local Internet service providers or ISPs 106 through which the client devices 102 and servers 104 communicate. The local ISPs 106 are also coupled to regional ISPs 108, which are coupled through an IP backbone network 110. Cellular and wireless service providers 114 couple their associated mobile or wireless users 112 through a gateway 116 directly to the Internet 110 (or indirectly through regional or local ISPs). The network 100 operates according to the well known TCP/IP (transport control protocol/internet protocol) paradigm, although it will be recognized that other protocols and transport mechanisms may be substituted.

One or more content sources 118 can optionally be coupled to each server 104, such that the servers 104 can act as distribution servers (as described in greater detail below with respect to FIG. 3). Alternatively, content can be transmitted to the server over the greater ISP/network infrastructure, or even directly to the content delivery "target" (e.g., the requesting client device) from the designated source.

In operation, the client device 102 (e.g., PC) of FIG. 1 utilizes its higher layer processes (e.g., web browser) to access URLs of interest, such selections being formatted into datagrams by the mid and lower layers of the protocol stack and transmitted over the physical bearer medium (e.g., DSL, cable modem, dial-up connection, or the like) to the local ISP, which routes the user datagrams to the appropriate destination(s). Datagrams generated by the destination (e.g., content server 104) are similarly routed over the packet-switched network back to the relevant recipient(s). Other details of the construction and operation of packet-switched data networks are well known, and accordingly not described further herein.

Figure 2:
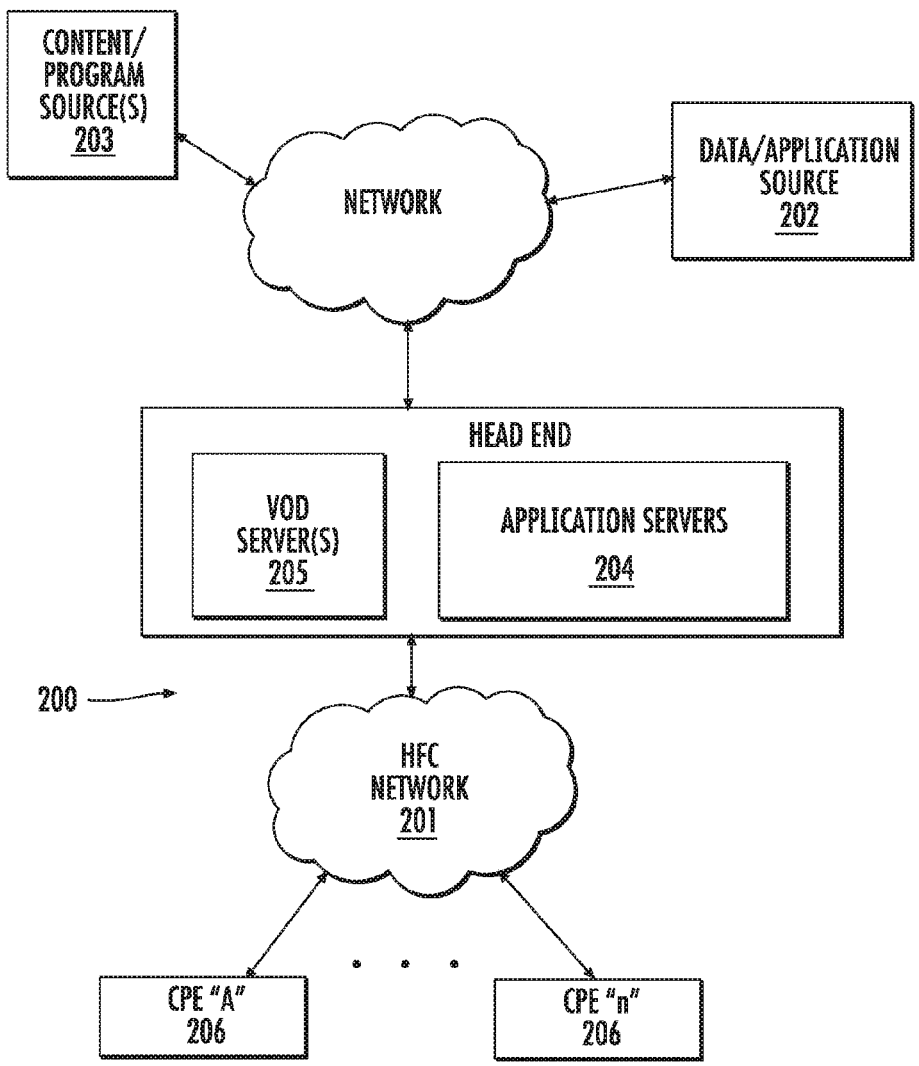
FIG. 2 is a functional block diagram illustrating an exemplary HFC cable network configuration useful with the present invention.

In a second embodiment of the invention, an HFC cable network is utilized as the basis for primary/secondary content delivery. FIG. 2 illustrates a high-level diagram of an exemplary configuration of such a network. The various components of the network 200 include (i) one or more data and application origination points 202; (ii) one or more content or program sources 203; (iii) one or more application/data/content distribution servers 204; (iv) one or more VOD servers 205, and (v) consumer premises equipment (CPE) 206. The distribution server(s) 104, VOD servers 205 and CPE(s) 206 are connected via a bearer (e.g., HFC) network 201 having coaxial and fiber (e.g., optical with DWDM or similar capability) distribution portions. A simple architecture comprising one of each of the aforementioned components 202, 204, 205, 206 is shown in FIG. 2 for simplicity, although it will be recognized that comparable architectures with multiple origination points, distribution servers, VOD servers, and/or CPE devices (as well as different network topologies) may be utilized consistent with the invention. For example, the head-end architecture of FIG. 2a (described in greater detail below) may be used.

The data/application origination point 202 comprises any medium that allows data and/or applications (such as a VOD-based or "Watch TV" application) to be transferred to a distribution server 204. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The content source(s) 203 may comprise any indigenous (i.e., MSO) or third party provider of content, whether direct or indirect. This content may comprise an MPEG (e.g., MPEG-2) stream, advertising content, or otherwise. The content may also pass through one or more intermediary nodes or conditioning process before transmission over the network 201, as is well understood in the art.

The application distribution server 204 comprises a computer system where such applications can enter the network system. The VOD server 205 comprises a computer system where on-demand content (as well as secondary content, if desired) can be received from one or more of the aforementioned sources 202, 203 and enter the network system. These servers may generate the content locally, or alternatively act as a gateway or intermediary from a distant source. For example, in one variant of the invention, the secondary content source comprises a dedicated VOD "advertising" server (not shown) in data communication with the VOD server. The advertising server provides indigenous advertising or similar secondary content (i.e., content that is maintained by the MSO or associated entity as opposed to a third party) that can be associated with the primary VOD content and delivered to the subscriber(s) over the VOD infrastructure, and viewed the same way as the primary VOD content (e.g., using the VOD application running on the subscriber's CPE).

The CPE 206 includes any equipment in the "customers' premises" (or other locations, whether local or remote to the distribution server 204) that can be accessed by a distribution server 204. Such CPEs 206 comprise processors and associated computer memory adapted to store and run the downloaded or resident application, as well as receive the streamed in-band content. For example, "Watch TV" or similar applications or their components (or updates thereto) can be downloaded to the CPE as required. For example, co-owned U.S. patent application Ser. No. 10/655,655 filed Sep. 5, 2003 and entitled "Technique For Updating A Resident Application And Associated Parameters In A User Terminal Through A Communications Network", which issued as U.S. Pat. No. 7,500,235 on Mar. 3, 2009, and is incorporated herein by reference in its entirety, describes one exemplary technique and architecture for updating applications resident on network CPE.

Figure 2A:
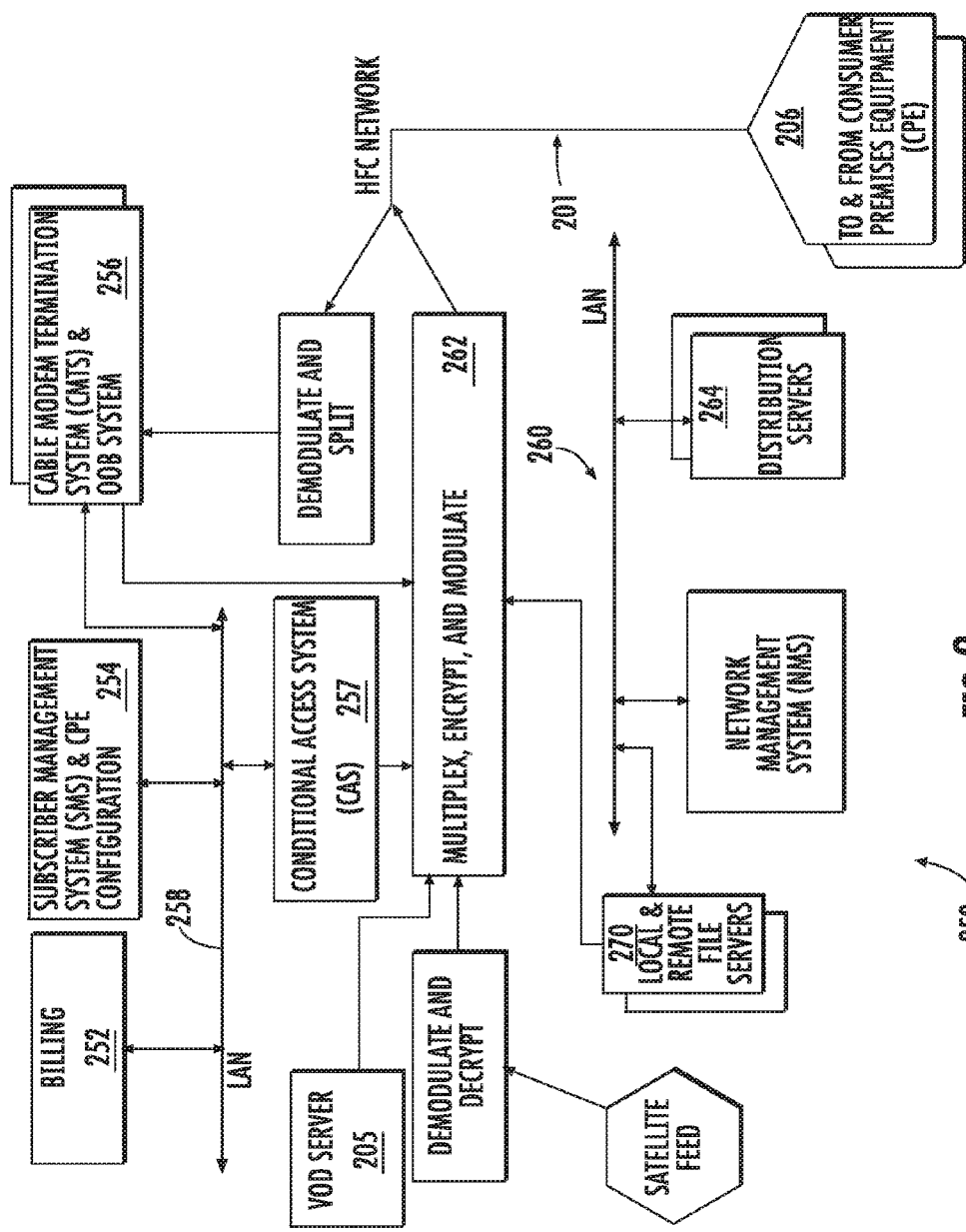
FIG. 2a is a functional block diagram illustrating one exemplary HFC cable network head-end configuration useful with the present invention.

Referring now to FIG. 2a, one exemplary embodiment of a head-end architecture useful with the present invention is described. As shown in FIG. 2a, the head-end architecture 250 comprises typical head-end components and services including billing module 252, subscriber management system (SMS) and CPE configuration management module 254, cable-modem termination system (CMTS) and OOB system 256, Conditional Access System (CAS) 257, as well as LAN(s) 258, 260 placing the various components in data communication with one another. It will be appreciated that while a bar or bus LAN topology is illustrated, any number of other arrangements as previously referenced (e.g., ring, star, etc.) may be used consistent with the invention. It will also be appreciated that the head-end configuration depicted in FIG. 2a is high-level, conceptual architecture and that each MSO may have multiple head-ends deployed using custom architectures.

The architecture 250 of FIG. 2a further includes a multiplexer/encrypter/modulator (MEM) 262 coupled to the HFC network 201 adapted to "condition" content for transmission over the network. The distribution servers 204 are coupled to the LAN 260, which provides access to the MEM 262 and network 201 via one or more file servers 270. The VOD servers 205 are coupled to the LAN 260 as well, although other architectures may be employed (such as for example where the VOD servers are associated with a core switching device such as an 802.3z Gigabit Ethernet device). As previously described, information is carried across multiple channels. Thus, the head-end must be adapted to acquire the information for the carried channels from various sources. Typically, the channels being delivered from the head-end 250 to the CPE 206 ("downstream") are multiplexed together in the head-end and sent to neighborhood hubs via a variety of interposed network components.

Content (e.g., audio, video, secondary content such as targeted advertisements or links therefore, etc.) is provided in each downstream (in-band) channel associated with the relevant service group. To communicate with the head-end or intermediary node (e.g., hub server), the CPE 106 may use the out-of-band (OOB) or DOCSIS channels and associated protocols. The OCAP 1.0 (and subsequent) specification provides for exemplary networking protocols both downstream and upstream, although the invention is in no way limited to these exemplary approaches.

In another embodiment, the network infrastructure includes one or more on-demand file or "carousel" functions. The present invention contemplates that not only will audio/video primary (or even secondary) content be delivered to CPE or other client devices using the network described herein, but also data for interactive applications (such as gaming) or other types of applications.

In addition to purely packet-switched (e.g., FIG. 1) or content-based HFC (FIGS. 2-2a), the present invention may also employ combinations or hybrids of the foregoing, such as where a CMTS and cable modem is utilized within the subscriber's premises to access packet-switched services over the HFC network, such as with a PC connected to the HFC network at the subscriber's premises. Similarly, satellite networks are readily configured to access such packetized services using their existing infrastructure.

Delivery of the primary/secondary content can also be effected over networks having wireless infrastructure, such as a cellular service provider network, WiMAX, satellite, millimeter wave, or Wi-Fi network.

It will be recognized from the foregoing that the features and advantages of the present invention are substantially topology- and mode-independent, and hence the invention can be practiced on literally any type of network having sufficient connectivity and bandwidth to deliver the requested content. For example, ring, star, bar, etc. networks may be used. Similarly, in the context of the content-based network of FIGS. 2 and 2a, different delivery paradigms may be used, including for example broadcast, on-demand (e.g., VOD) or switched digital broadcast (SDB). Many permutations and combinations of these topologies and transport media can be readily devised by those of ordinary skill.

Figure 3:
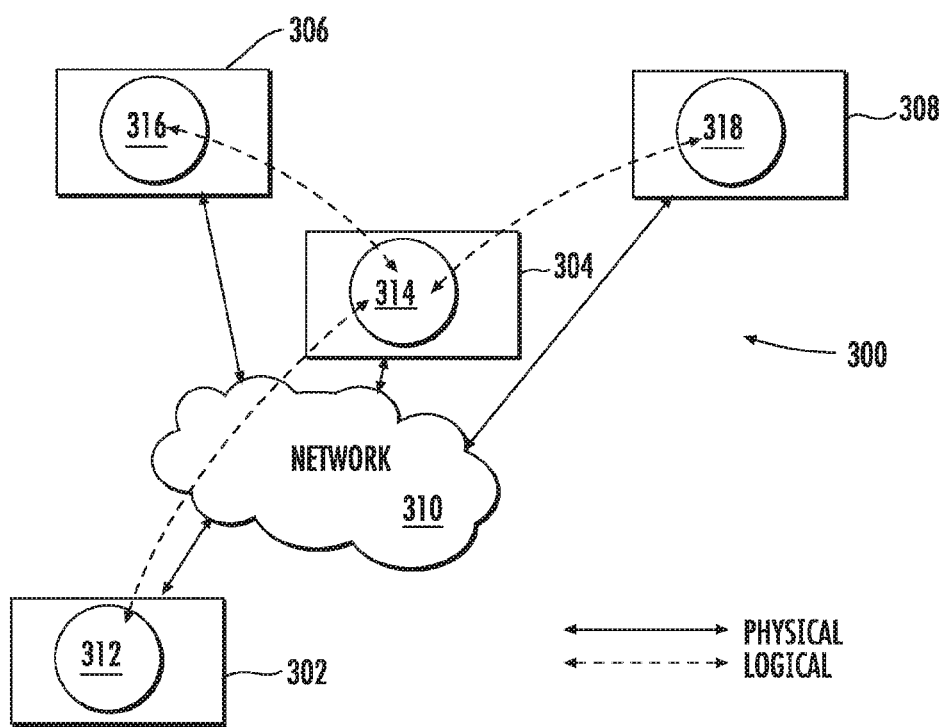
FIG. 3 is a graphical representation of one exemplary network hardware/software architecture according to the present invention.

Referring now to FIG. 3, one exemplary network software architecture for implementing the context-specific content delivery functionality of the invention is described in detail. While described primarily in the context of the exemplary IP-based data network of FIG. 1, it will be recognized that the generalized architecture of FIG. 3 can be generally applied to the architecture of FIGS. 2-2a as well, and in fact yet other architectures including without limitation satellite or DVB network systems.

As shown in FIG. 3, the architecture 300 comprises a user or client device (e.g., PC or laptop computer) 302, a site distribution server 304, a primary content server 306, and a secondary content server 308. Each of these devices 302, 304, 306, 308, are in data communication with one another over interposed network infrastructure 310, such as for example a TCP/IP based data network. As can be appreciated by those of ordinary skill, the selected protocols, transport mechanisms, and network infrastructure are not significant to the content delivery functionality, but rather are merely implementation-specific details depending on the particular application of the invention. Also shown in FIG. 3 are a plurality of logical processing entities including a client entity 312, a distribution server entity 314, a primary content entity 316, and a secondary content entity 318, which in the illustrated embodiment comprise computer programs or applications. These entities are in logical communication with one or more of the other entities so as to effect communication and data transfer as described herein over the selected transport mechanism and infrastructure.

In the exemplary embodiment, the client entity 312 comprises an internet browser and associated video/media software application which is adapted to display both the primary and secondary content as described subsequently herein. In one variant, this application is a custom-developed media player application which has the ability to seamlessly segue the primary content into the secondary content within the same display window generated by the parent platform's operating system. Commercially available media players such as Microsoft Windows Media Player or Real Player can be adapted for this purpose as well if desired.

In the exemplary embodiment of the invention (see FIGS. 6a-6c and supporting discussion thereof), the primary content display window is advantageously configured and scaled so as to fit within an existing HTML or similar page layout, so that when invoked, the media player does not cause a resizing of any display or generation of a new window. Rather, the media player simply begins displaying the video portion of the content within an existing portion of a display window on the web page. This functionality, while desirable in many circumstances, is clearly not essential to practicing the invention, however.

Search Engines and Advertising Servers—

A number of different search technologies (and in some cases associated advertising or other content servers) can be utilized consistent with the invention. Each such search engine provides its own methods and algorithms for finding data within its indexes/databases. The various types of directories and search engines presently available for use on the Internet include primarily category-based directories and crawl-based engines.

Category-based directories use categorically segregated listings of popular or informative web sites based on the opinions of the directory editors. Although most directories are keyword searchable, they generally have a rigid hierarchy of categories. Category based directories include for example the earlier versions of Yahoo!®, the "Open Directory Project" (ODP), and Zeal™.

Crawl-based search engines (e.g., Google, AltaVista™, Lycos®, Teoma, AlltheWeb, Direct Hit, etc.) are software tools which allow Internet searchers to locate information on the Internet based on keyword phrase queries. Search engines present results from their database of Internet web sites, also called a search engine index. Search engines build their indices by sending out software spiders to crawl the web collecting content by specific web page URL.

In one exemplary embodiment of the present invention, the Google "AdSense" suite of services is utilized as the basis of the secondary content source. The Google "AdSense for Content" provides contextually targeted advertisements to users. Access is provided to a large number of advertisers, and advertisements from these advertisers are served on designated content pages. User sites are compensated for traffic (e.g., "click throughs") on displayed advertisements, thereby generating revenue for the site operator.

As part of this system, Google places contextually relevant CPC (cost-per-click) and CPM (cost per thousand impressions) advertisements into the same "auction" on a competitive basis. The auction takes place instantaneously, and subsequently AdSense will automatically display the text or image advertisement(s) that ostensibly will generate the maximum revenue for a given target page. The selection of advertisements is accomplished using, inter alia, the Google search engine page "crawler" technology.

Google AdSense technology is dynamic, such that as the page or site content changes, the advertisements returned by the server change to match. These advertisements are also targeted by country.

Features of the exemplary Google AdSense solution include: (i) competitive advertising filters that can be used to block competitive advertisements, or others, using a simple URL blocking mechanism; (ii) review of advertisements before they appear on a site, using a combination of human and automated processes; (iii) sensitive content filters that filter inappropriate content for pages, such as news about a catastrophic event.

The user is also afforded the ability to customize the appearance of its advertisements using a point-and-click graphics/color selection tool. One can also monitor their advertisement performance with customizable online reports that offer information such as the number of page impressions, clicks and click-through rate.

Google "AdSense for search", a complimentary technology, adds a Google search box to the host site in an attempt to "monetize" more web pages while offering users a direct link or interface to the Google search engine tool. Site users can search from right the host site, as opposed to having to access the Google home URL. And since AdSense serves targeted advertisements on search results pages, a host can feasibly increase revenue from this Google search box as well since the user will be presented with advertisements that are contextually related to the results of their user-specified query.

While generally effective, contemporary search engines such as Google still often receive several irrelevant (or less relevant) results making search sessions less effective. All search engines generally are susceptible to the quality of the raw data being fed into them in one manner ("GIGO", or "garbage in, garbage out"). Over time, filters and other processing techniques have been added to help contain the problem of data "trash dumping" from search engines. Accordingly, depending on the quality of results returned by the selected search tool, and the sensitivity of the selected engine or tool to its inputs, the present invention contemplates the use of one or more stages of "front-end" and/or "back-end" processing.

As used herein, the term "front-end" processing refers broadly to processing performed on the metadata (or related data structures) before transmission to the secondary content source (e.g., search entity).

Conversely, the term "back-end" processing refers broadly to processing performed on the returned secondary content (or data relating thereto).

It will also be appreciated that while the exemplary embodiments of the invention are cast in terms of a non-deterministic search engine paradigm (e.g., Google AdServe or the like), the secondary content source can be deterministic in nature. For example, in one variant, the secondary content is selected for delivery based on entry into a prescribed data structure (e.g., table or database) which returns the secondary data according to a known functional relationship. The secondary content source, whenever the metadata query contains a given phrase or search string, returns a known set of results which have been pre-screened to closely relate to the topic or context of the primary content. This approach may be of particular use where the range of different content/contexts is more limited, and/or it is desired to assure the quality of the secondary content presented (such as in educational or enterprise applications where presentation of an inapplicable link may reduce efficiency or even be detrimental). Hence, under this model, an exemplary metadata string of "foam insulation" associated with a NASA space shuttle instructional video (primary content) would deterministically return a set of predetermined links to other related topics such as insulation failure modes, installation techniques, inspection/NDT tests, etc. In this capacity, the secondary content is akin to a relational database for the metadata associated with the primary content.

Metadata and Search Query Generation—

Generally speaking, "metadata" comprises extra data not typically found in typical primary content (or at least not visible to the users of the network). For each component of primary content (e.g., video/audio clip) or other content present on the site, one or more metadata files are included that specify the relevant search terms or primitives for that content. This metadata can be provided with the content from its source or provider (e.g., a network studio or station or the like), or alternatively added by the site operator (e.g., Time Warner cable for the exemplary "Road Runner™" site referenced herein). Alternatively, portions of the metadata can be added by multiple entities, and/or editing of another entity's metadata performed. Various permutations and mechanisms for generating, adding and editing metadata will be recognized by those of ordinary skill, and hence are not described in greater detail herein.

Different types of search term generation may be utilized consistent with the present invention. In one embodiment, the metadata is arranged according to a prescribed format or layout, and the search terms are selectively stripped out of the metadata file using, e.g., an algorithm or computer program adapted to identify specific fields or portions of the format of particular utility for purposes of search engine queries. This format may be common across all content vendors, or alternatively each different vendor may utilize their own format, which is then mapped to a common output query using the aforementioned algorithm (and even human intervention). For example, in one variant, all primary content vendors adopt a common format which may include, e.g., (i) a title field, (ii) lead-in or tag line field, and (ii) a content category field. The algorithm then identifies these fields (such as vie field stop/stop identifiers embedded in the metadata), and then assembles the data in these fields into a query, such as by placing them in a Boolean AND relationship.

In another variant, individual content vendors can utilize their own proprietary or non-proprietary format, which is submitted to the website operator (or MSO) so that their particular format can be mapped to a common query format by the program. For example, a first primary content vendor may use the format described above (title, tag line, and category) in that order, whereas another vendor may invert that order within their metadata structure. Hence, the algorithm of the present invention is coded (such as by an operator or programmer) to recognize the format of a particular vendor, such as via a vendor ID or similar coding, and then identify and extract the desired fields of metadata so as to place them in the proper query format.

It is also noted that the vendor formats may be heterogeneous in terms of metadata content, such as where one vendor provides metadata that another does not. In such a case, the output or query mapping (as well as the input or metadata mapping) may be different as well. As noted elsewhere herein, the mapping algorithms may also be "agile" or variable based on search engine selection, such as where a first mapping/query structure is used for a first engine, and a second mapping/query structure is used when a second, different search engine is selected.

In another embodiment, the metadata contained in the file is sent en masse to the search entity, effectively relying on the search engine to perform the logic processing necessary to return relevant results, ignore common words, hyphenation, etc. This obviates much if not all of the "front end" processing required by the invention, but also places a significant burden on the search engine/secondary content source to be able to properly process the raw metadata and produce relevant results.

In yet another embodiment, the metadata extracted from the file is processed to produce derivative search terms or query strings. For example, a word or phrase present in the raw metadata may cause the replacement of that word or phrase with another, or the addition/subtraction of other terms. As an illustration, the metadata word "Discovery" or "Enterprise" may cause the processing algorithm of the invention to append the term "space shuttle" onto the string, or substitute the latter for the former.

The metadata information is packaged in a prescribed format such as XML, and associated with the primary content to be delivered; e.g., as responses to user selection of a video clip link on a website. As shown in FIG. 3a, the exemplary metadata comprises human-recognizable words and/or phrases that are descriptive of or related to the content of the clip in one or more aspects ("contextually related") to the primary content. In the illustrated embodiment, the metadata is made human-readable to facilitate easier generation and searching; however, this is not a requirement. For example, in some cases, it may be desirable to encrypt the metadata so as to prevent unauthorized access. Alternatively, unencrypted but non-human readable data can be used, such as where the metadata is encoded in hexadecimal or binary, or any other number of different coding schemes.

In the exemplary embodiment, a metadata file resides at the location (URL) of each requested primary content element. The naming convention of this file is optionally standardized so that it is easily locatable. All of the metadata files are rendered in the same format type (e.g., XML) for consistency, although heterogeneous file types may be used if desired. If metadata files are encrypted, then encryption algorithm information of the type well known in the art is included. The foregoing information may be in the form of self-contained data that is directly accessible from the file, or alternatively links or pointers to other sources where this information may be obtained.

As will be appreciated by those of ordinary skill, the scope of the search string utilized for the secondary content source query can significantly affect the number, type and quality of results obtained. Specifically, the results obtained by entering a search string comprising a portion of the metadata may actually return more or less applicable or related results than using a subset or superset of that portion. Consider, for example, the case where the metadata contains the words "NASA space shuttle fuel tank insulation failure" in that sequence. A search of the secondary content database using this entire string might return results that are very germane to the topic of space shuttle insulation failure. However, merely submitting the term "insulation failure" to the same search process may return many unrelated links or references, such as those relating to electrical cable or housing attic insulation failure. Hence, the choice of search string/query composition is contemplated by the present invention to optionally vary as a function of the engine/database chosen, recognizing that certain engines/databases return better results using certain query formulations, while others require different formulations for optimal returns. For example, in one variant, different engine-specific metadata files can be attached to or associated with the same content, each of the files being optimized for its intended engine. This can be accomplished either automatically (e.g., via a computer program adapted to appropriately "shape" the metadata), or manually by a human operator experienced with the best query constructions for each engine.

It will also be recognized that the present invention can be utilized such the secondary content is placed preceding or contemporaneously with the primary content if desired. For example, as previously described, the metadata or other similar information is analyzed and forwarded to the search entity (e.g., search engine) during or after the video viewing process. However, since the analysis and search operations can be accomplished with very little delay, these results can be displayed to the user before or during the video, such as in a dedicated region of the player display window that is reserved for such functions. In one variant, the dedicated region comprises a small bar or strip disposed at the fringe of the viewer display area, such that the user can view the primary and secondary content without significant eye movement. The secondary content returned from the search entity is displayed in e.g., a slowly progressing "ticker" or scroll fashion, thereby allowing the user to digest the secondary (e.g., textual) content without significantly interfering with their viewing of the primary content. This approach also has the advantage of allowing the user to selectively terminate their viewing of the primary content when a particular point of interest is identified. For example, where the user is viewing a video clip regarding the launching of the NASA space shuttle, and halfway through views a scrolling link to information on shuttle ceramic insulating tile failure (the reason they selected this particular video clip in the first place), they may wish to jump immediately to that link without having to view the rest of the video clip. Under the "primary-then-secondary" paradigm previously described, the user must wait until the video clip has completed before the relevant secondary data is displayed or otherwise provided. For lengthy clips, this could be potentially frustrating, especially given the contracted attention span/patience of many Internet users.

The metadata or other such search-enabling information can also be arranged in a particular sequence or pattern so as to facilitate certain types of desired behavior. For example, in one embodiment of the invention, the metadata associated with the primary content can be parsed or otherwise segregated and associated with particular (e.g., temporally divided) portions of the primary content, such that the tickered/scrolled secondary content is related to specific portions of the clip. As a simple illustration, consider a video clip that covers two distinct concepts relating to the same topic, such as (i) a discussion of the successful space shuttle launch on Jul. 26, 2005, and (ii) a discussion of other NASA ongoing missions (e.g., Mars Rovers). While generally falling under the heading of "NASA" or "space missions", these two sub-topics may return decidedly different advertising, informational, etc. links. It may also be somewhat confusing for the user to view secondary content (e.g. links) for Mars rovers while viewing video content on the space shuttle launch. The present invention allows segregation of the secondary content such as by restricting use of certain metadata to restricted contexts; e.g., only when the user is viewing the relevant section of the primary content. The secondary content effectively "tracks" the primary content in a substantially contemporaneous manner.

Hence, the invention is not limited to the "primary-then-secondary" content delivery paradigm previously described in the context of the exemplary embodiment.

While described herein primarily with respect to a single logical context, the primary content of the present invention may have multiple different contexts that can be used as the basis for obtaining relevant secondary content. For example, a video clip regarding the space shuttle may talk about the successful launch of the craft, as well as issues relating to foam insulation separation, and also the ceramic insulating tiles on the craft's exterior. Hence, three distinct logical threads exist within this video clip that could each be used as the basis for a search for related secondary content. These three logical contexts can be segregated or otherwise reflected within the metadata if desired, so as to provide improved granularity and accuracy for the returned results. In one exemplary embodiment, the secondary content displayed to the user is reflective of each of the different contexts; i.e., one displayed link relates to the first contextual thread, the second link to the second context, and the third link to the third context. Myriad other possible approaches may be used consistent with the invention so as to permit the return and display of multi-context secondary information.

The metadata contained in the file or other data structure may also be used as an input to a front-end processing module, such as to generate derivative or modified search queries. For example, the metadata file may contain raw or unprocessed metadata (e.g., a collection of words and/or phrases), which can then be used to generate modified search queries. Such modifications or front-end processing of the raw data may include filtration of certain words or phrases (such as common conjunctives, punctuation, "wildcard" characters, expletives, etc.), changing of the tense, grammar or spelling of words (e.g., correcting typographical errors which may throw off the search engine), joining two or more words into a single search term/phrase, substitution or replacement of certain words or characters, and so forth.

It will also be recognized that the delivery of secondary content can be "mixed mode"; i.e., that URLs or links provided to the user can be of mixed types. In effect, the front- and back-end processing can be adjusted to splice or otherwise combine different types of secondary content together before or during display thereof. For example, one type of secondary content might comprise advertising links (obtained from, e.g., an ad server as previously described), while another type might comprise informational or resource links (obtained from, e.g., a library or educational server). These two (or more) types of secondary content can be intermixed according to any scheme and displayed to the user. On such display scheme might comprise color-coding the different types of links, and/or placing them at different locations within the display window or device screen.

One significant issue with utilizing user- or address/CPE-specific data within the network is privacy. Specifically, the viewing or web-surfing habits of particular users/devices/premises is generally not information that the user or subscriber wishes to be divulged or distributed, and in fact significant liability may result to the ISP or MSO if such information is divulged (or surreptitiously accessed). Hence, one embodiment of the invention allows for the use of such information "blindly", so that an association between the particular data and a premises/device/user cannot reliably be made. One approach for providing such privacy or disassociation comprises using a cryptographic hash, wherein the user's identifying network information (e.g., IP address, MAC address, TUNER ID, etc.) is input to a cryptographic algorithm which generates a hashed output which can reliably be repeated, but not "reverse-engineered" or processed to determine the original input variable. The ISP, MSO or third party secondary content provider (e.g., Google) can maintain a correlation table or other data structure that relates these hashed variables to certain historical or profiling data, and hence any time a metadata search is invoked by that device (as identified by its hashed address), the historical or profiling data can be utilized without knowing the particular identity of the device or subscriber.

It will further be recognized that this correlation table/mechanism, and in fact the search query process itself, may also be more than one-dimensional.

One exemplary apparatus and method for providing such cryptographic hashes (as well as a corresponding "opaque" variable useful for transmitting other network-related data) is described in co-owned and co-pending U.S. patent application Ser. No. 11/186,452 entitled "METHOD AND APPARATUS FOR BOUNDARY-BASED NETWORK OPERATION" filed Jul. 20, 2005 and incorporated herein by reference in its entirety, although it will be recognized that any number of other different approaches may be used as well for maintaining user privacy and anonymity.

In practice, when the front-end or back-end processing entity wishes to utilize user/device profiling data, the IP or MAC address (or other such information) of the requesting device is hashed, with the resulting output being used to access a table or database of historical or other profiling data based on that hash. The relevant records are then accessed and applied (either to the search term generation step, via the front-end, or the generated results, via the back-end) in order to "shape" the secondary content provided by the user in an anonymous fashion. Anyone accessing the aforementioned table or database will have access to all of the profiling data, yet will not be able to correlate this data with any specific user or device, since the only relevant identifying information (e.g., IP or MAC address) has been hashed and cannot be reversed to identify a specific subscriber or device.

Methodology—

Figure 4:
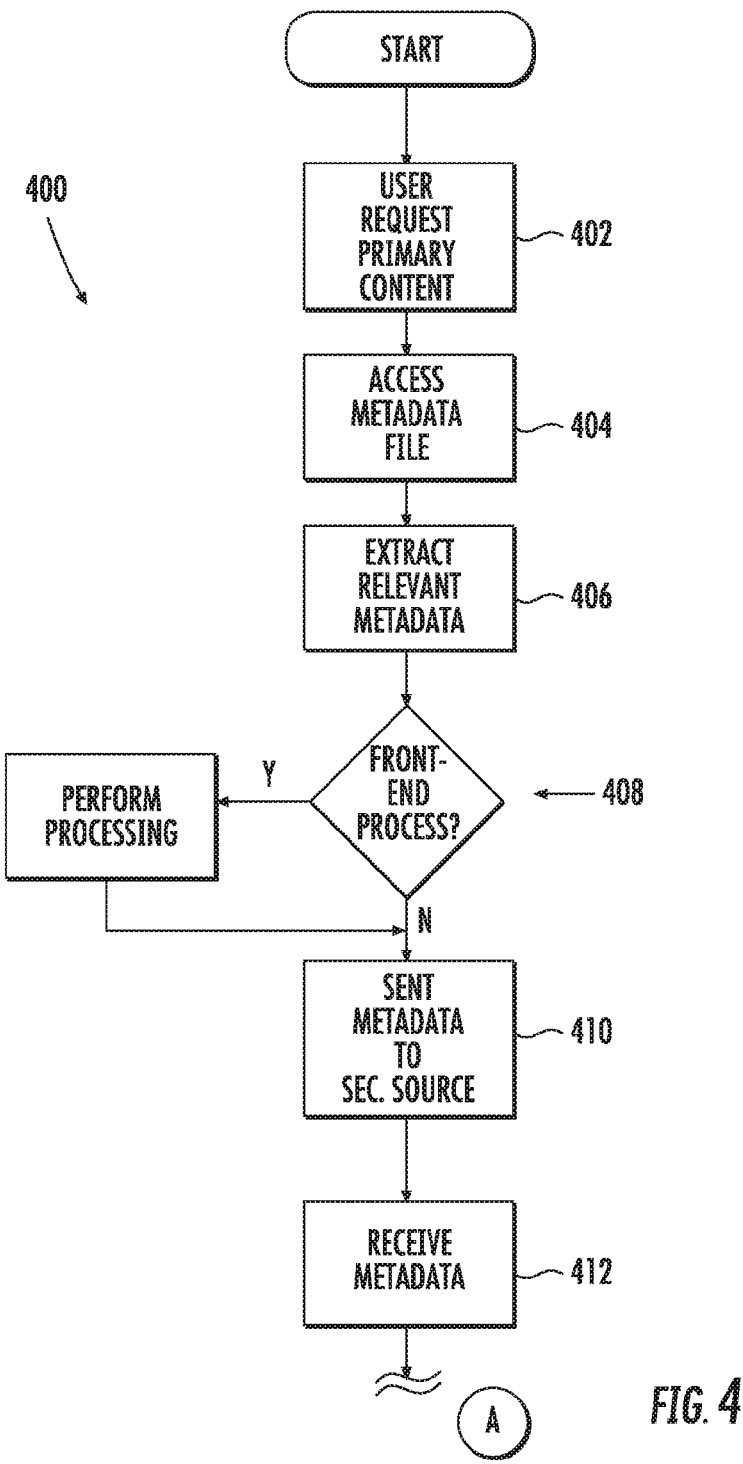
FIG. 4 is a logical flow diagram of an exemplary embodiment of the generalized method of providing contextually related primary and secondary content according to the invention.
Figure 4:
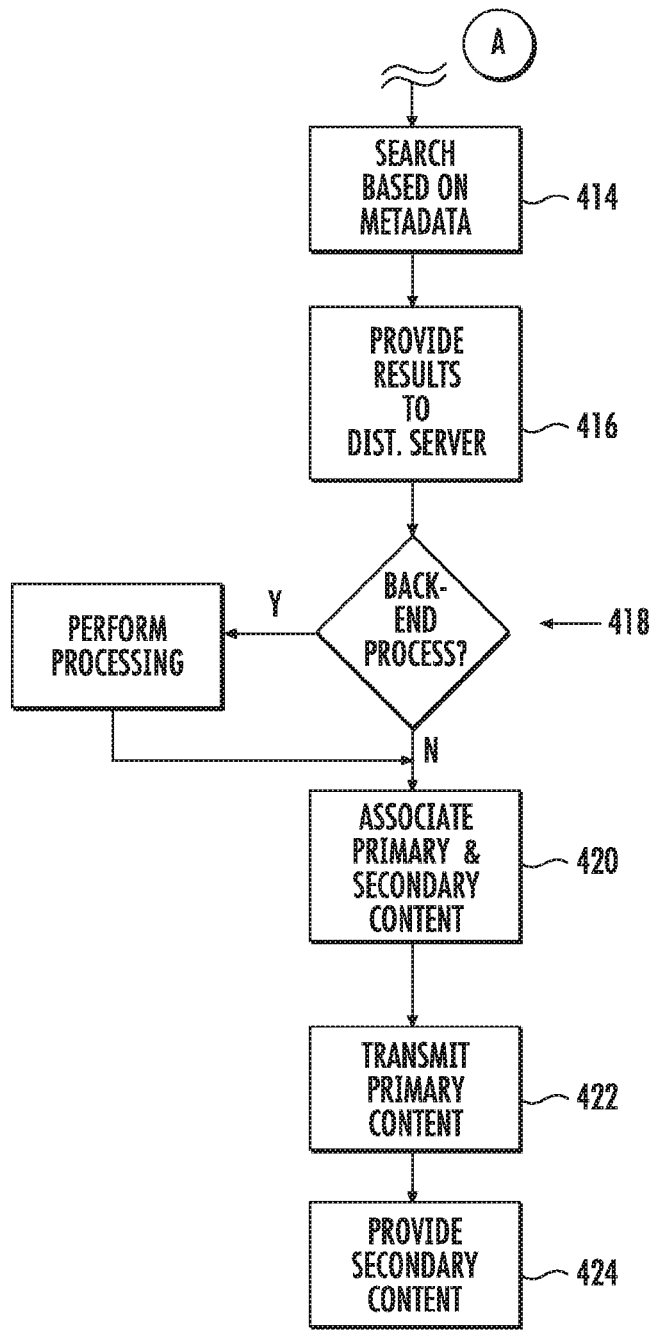

FIG. 4 illustrates one embodiment of the generalized methodology of providing contextually related primary and secondary content according to the invention. The method 400 assumes that the client "media player" program or specific application is first loaded onto the client device (e.g., PC 102, handheld, or CPE 206). The program may be resident as part of the installed software or platform operating system (e.g., MS Windows®), or downloaded at runtime. In the case of CPE 206, the client media player can be a standalone application, part of the navigation or EPG application, or even be part of the CPE firmware or middleware. The program can be delivered to the client device via any number of different mechanisms, such as Internet download, WAP push, OOB or in-band channels, retrieval from a local mass storage device, or even via fixed or temporary media such as a CDROM, DVD, USB key, etc.

Per step 402, the user invokes their client device 302 to request a download of the primary content form the distribution entity 314. In the case of a PC 102, this comprises the user causing their network interface software (e.g., Internet browser) to access a specific Internet or network site via, e.g., a universal resource locator (URL), and then selecting a hyperlink or similar mechanism on that site to cause initiation of downloading of the desired content.

In response to this request, the distribution server entity 314 servicing that site will access the associated metadata file for the requested content (step 404), and extract the relevant metadata (step 406). The extracted metadata is then optionally subjected to additional "front-end" processing (step 408) to produce processed metadata, and the processed (or unprocessed) metadata subsequently sent to the secondary content source per step 410.

When the secondary content source receives the metadata (step 412), it accesses its content database or other resources to identify relevant secondary content based on the metadata (step 414). In the exemplary embodiment, the secondary content source comprises a search engine (e.g., Google AdServe, as described in detail previously herein), although other configurations and approaches may be used alone or in combination.

When the secondary content has been identified by the content source, it is then provided to the distribution server (step 416), at which point the distribution server entity 314 associates the secondary content with the primary content (step 420). If any "back-end" processing of the results is desired/required, this is also performed (step 418).

Note that the provision of the secondary content, and association with the primary content, need not be physical or literal. For example, the secondary content source may simply identify the storage location(s) of the relevant secondary content to the distribution server entity 314, and the association performed by linking the primary content to these location(s). Alternatively, the secondary content (e.g., HTML/SGML/XML links) may physically be transmitted to the distribution server entity, which can then package the received HTML/SGML/XML text within the primary content (e.g., within a common file, directory, data structure, etc.) for transmission to the client device.

Next, the primary content is transmitted to the client device, either in the form of a file (e.g., executable) or a streaming media transmission (e.g., according to a prescribed ITU or similar protocol) per step 422. The secondary content may provided to the client device (step 424) in any number of different ways, including inter alia: (i) being included with the primary content and transmitted therewith by the distribution entity 314; (ii) transmitted by the distribution entity 314, but as a separate transmission (e.g., to a different port or socket); or (iii) transmitted by a third-party entity (e.g., ad server) directly to the client device.

Server Device and Entity—

Referring now to FIG. 5, a first embodiment of the improved network server device 304 with distribution server entity 314 as shown in FIG. 3 is described. It will be appreciated that while described in the context of an IP-based network server 304 as shown in FIG. 3, the device may be adapted for use at other locations within the network, and in different types of networks (e.g., the HFC network of FIGS. 2-2a). Furthermore, as previously noted, the server entity 314 may comprise a distributed functionality, wherein two or more portions of a distributed application (DA) in communication with one another are utilized.

As shown in FIG. 5, the exemplary server device 304 generally comprises an network server module including a digital processor(s) 504, RAM 505, mass storage device 506, and a plurality of data or signal interfaces 507 for connection with other network apparatus such as LANs, IP routers, switches and other packet network devices, network management and supervisory systems, local PCs, host interfaces and/or bridge, etc. Other components which may be utilized within the server device 304 (depending on where it is employed and how it is physically implemented) include a protocol stack, VPN capability, encryption/decryption algorithms, board level electronic components, as well as media processors and other specialized SoC or ASIC devices. Support for various processing layers and protocols (e.g., 802.3, UDP, H.323/RTP/RTCP, VoIP, SIP, etc.) may also be provided as required.

The server device 304 of FIG. 5 may take any number of physical forms, comprising for example a stand-alone computer device, or one of a plurality of discrete modules or cards within another network component (e.g., router or switch) of the type well known in the art. The server may also comprise firmware, either alone or in combination with other hardware/software components such as those previously described.

It can also be appreciated that the methods of the present invention may be practiced using any configuration or combination of hardware, firmware, or software, and may be disposed within one or any number of different physical or logical entities. For example, the primary and secondary content functionality described above may take the form of one or more computer programs running on a single device disposed within the network (such as the server module 304). As yet another example, portions of the functionality may be rendered as a dedicated or application specific IC (ASIC) having code running thereon. Myriad different configurations for practicing the server device of the invention will be recognized by those of ordinary skill in the network arts provided the present disclosure.

The distribution server entity 314 comprises, in the illustrated embodiment, a software entity which is adapted to communicate with the browser (and media player) of the client in order to download or stream the requested content to the client device. For example, when the user accesses the relevant website URL (e.g., www.rr.com) of the network provider using their Internet browser, they are given the opportunity to view a variety of hyperlinks which will invoke the media player application to "play" content streamed to the client device from the distribution server. The higher layer processes running on the client generate, for example, a request which is transported and processed according to the well-known TCP/IP protocols and transmitted in packetized form over the interposed IP network to the distribution server, the higher-layer processes thereof which communicate with the media player application to subsequently download the content or create a packetized media stream (e.g., in MPEG2 or similar format) to the client device for playback by the player application. Such processes are well known in the data networking arts and accordingly not described further herein.

However, unlike the prior art, the distribution server entity 314 of the present invention also identifies and physically or virtually "appends" the secondary content related to the primary content for viewing (or other sensory perception) within the same display window generated by the media player application on the client device 302. Specifically, in one embodiment, an XML or similar metadata file associated with the requested primary content is accessed in order to generate one or more search terms for submission to the secondary content provider entity 318. After a finite yet typically variable time period, the results of this query are returned by the secondary entity 318 to the distribution server entity 314, for any "back-end" processing and ultimate inclusion with the downloaded or streamed primary content.

This process of generating the search terms ("front-end" processing), delivery to the secondary content source, receipt of results from the secondary source, and any required back-end or post-delivery processing, can occur either before download or streaming of the primary content to the client entity 312 or thereafter, depending on the particular application and desired attributes. For example, in one variant, upon receiving the user request for the primary content, the distribution entity 314 accesses the metadata file for the requested content, constructs the search query, and forwards this query to the secondary content provider, for example the Google AdServe function described in greater detail subsequently herein. This source then generates a list of relevant secondary content (e.g., text or XML/HTML/SGML-based links) and forwards this information to the distribution entity 314. During this time, the distribution entity holds the primary content from delivery until the secondary content is received, and then proceeds to append the secondary content to the primary content (e.g., by forming a unitary content file) for transmission to the client device 302 over the network. When the file has been received, the client media player application merely plays the file, which includes a seamless transition from the primary to the secondary content within the player application's display window.

Alternatively, the aforementioned delivery of primary content can begin before the delivery of the secondary content to the distribution server entity 314 (or even before the search query has been generated, or the metadata file accessed). This provides a "rolling start" to the content delivery, with the expectation that the search query generation, transmission to the secondary content source, return of results, any necessary back-end processing, and packaging/transmission will all occur before the expiration of the primary content playback on the media player. The secondary content, which may comprise a separate downloaded file or alternatively a media stream, can simply be delayed (such as by buffering in a FIFO) until it is required to start.

A separate software port or socket identifier/address can be utilized for this purpose, so as to permit contemporaneous receipt of the primary content stream and secondary content stream by the client, and subsequent assembly of these two streams into one contiguous media stream for playback by the application. See, e.g., U.S. Pat. No. 5,406,322 to Port, et al. issued Apr. 11, 1995 and entitled "Packet-switched ring network having direct access to low and high bandwidth memories", incorporated herein by reference in its entirety, wherein one exemplary use of different socket identifiers (i.e., for accessing different types of data storage areas for different types of data) is disclosed.

As yet another alternative, the distribution server 304 can pass the primary content to the client device 302, while a second server or other network entity (not shown) passes the secondary content to the client device via a parallel logical process, upon signal or message from the distribution server or client. For example, the aforementioned Google AdServer server can be configured to transmit the results of any queries initiated by the distribution server 304 directly to the client device (or another intermediary entity) for processing at the receiving device, versus processing and distribution by the host distribution server. To this end, the client device can be configured with "back end" processing software which can receive the secondary content/results via a separate communications process, and algorithmically process the received information for presentation by the video player application as previously described.

For purposes of sequencing the packets between the two streams (which may arrive out-of-order, regardless of whether issued by a common server or different servers), a packet sequence ID or similar mechanism can be used to place the secondary content at the desired location with respect to the primary content. Furthermore, quality-of-service (QoS) requirements and mechanisms of the type well known in the art can be utilized with respect to the content streams if desired to ensure data integrity.

Furthermore, it will be recognized that the primary content can be downloaded and "played", such as via an executable file or the like, or alternatively streamed in real-time (or near real-time), such as in a VOD process of the type well known in the art. Such streaming can be continuous, or alternatively conducted in two or more contiguous or non-contiguous segments, such as for example when using "trick mode" functions with the aforementioned VOD capability. In the case of the aforementioned VOD paradigm, the secondary content associated with such VOD primary content may be derived, e.g., from the VOD advertising server or similar indigenous source within the MSO's network, or alternatively from an external source such as via a network connection from the VOD distribution network.

It will also be appreciated that while shown as separate logical (and physical) entities in FIG. 3, the aforementioned architecture 300 may be embodied as one or more integrated entities, such as where the distribution, primary, and secondary content entities are integrated into a single software application running on a network server. This approach might be used, for example, where the website operator maintains its own primary and secondary content sources. Typically, however, at least one of the primary and secondary content sources will be operated by a third party, thereby necessitating a more distributed architecture such as that of FIG. 3.

Display Elements—

Figure 6A:
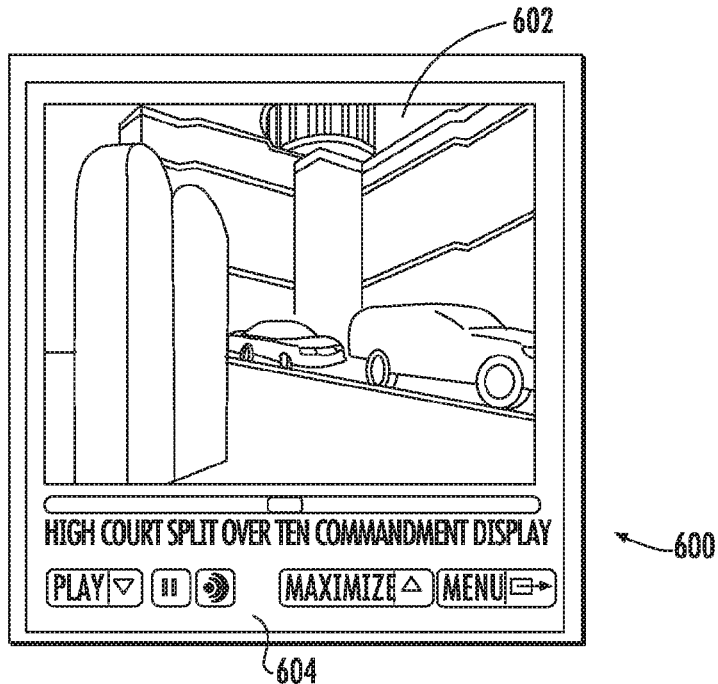
FIG. 6a is a graphical representation of a first embodiment of the display element (e.g., window) according to the invention, showing the window during primary content viewing.
Figure 6B:
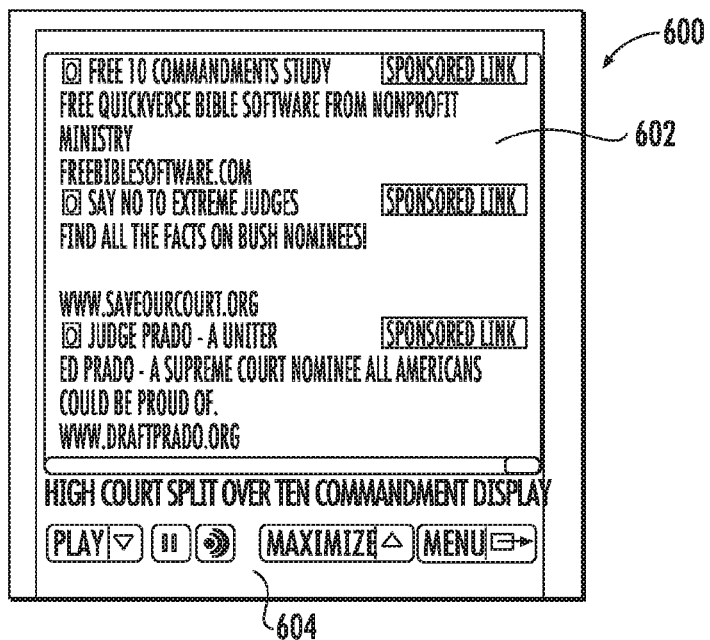
FIG. 6b is a graphical representation of the display window of FIG. 6a, showing the window after transition to the secondary content.

FIGS. 6a and 6b illustrate one exemplary display element configuration useful with the present invention. As shown in FIG. 6a, the display comprises a display window 600 which is generated on the user's display device (e.g., computer screen) and which contains a video viewing area 602, as well as a control panel 604. Computer display element generation and operation are well known in the software arts, and accordingly not described further herein. However, in the present invention, the display window 600 is utilized for the additional purpose of displaying the secondary content (FIG. 6b) at, e.g., the completion of the primary content. As shown in FIGS. 6a and 6b, the same window is used for the display of both primary and secondary content, with the transition between the two ideally being seamless (regardless of the sequence of display).

Furthermore, as shown in FIG. 6c, the window display viewing area 602 is optionally configured to coincide with an existing HTML/SGML/XML structure (e.g., within a web page "frame" 610) so that when the user selects a given video or other primary content link, the viewer display area 602 coincides with the window 610, thereby advantageously maintaining complete visual continuity for the user. No secondary windows, pop-ups, or the like that are common with prior art approaches are utilized in the exemplary embodiment for this reason.

The secondary content may also be audible in nature, such as for example where a TTS (text-to-speech) algorithm of the type well known in the signal processing arts is used to generate audible "links" from the returned secondary content. These auditory links are synthesized generally in the same manner as their visual counterparts, yet just via the audio system of the host client device, such as at the termination of the primary content video clip. A corresponding speech recognition algorithm (such as for example the IBM "ViaVoice" product) can be used to supply user inputs to the client device in order to respond to these auditory links.

Operations/Business Rules Engine—

In another aspect of the invention, the query, results and delivery of the secondary content can be subjected to a operational or business "rules" engine, wherein the degree of relatedness (context quality), type, quantity, order, and other parameters associated with the delivery of the secondary content can be controlled in order to achieve or maximize one or more desired objectives, whether related to optimizing user/customer satisfaction, business or revenue performance, network operations, or otherwise.

In effect, the rules engine comprises a supervisory entity which monitors and selectively controls the search query formation, distribution, and results selection/presentation functions at a higher level, so as to implement desired operational or business rules. The rules engine can be considered an overlay of sorts to the basic browser and application (e.g., video player) algorithms. The rules may be applied selectively in terms of time of day, duration, specific local areas, or even at the individual user level.

This engine comprises, in an exemplary embodiment, a series of software routines running on the server device 304 or other associated hardware/firmware environment. Alternatively, all or portions of this engine can be implemented on the client device 302, such as for example where control of the "front end" processing is desired. The rules engine may also be controlled via e.g., a GUI on a PC connected to the server 304 or other platform (even remote to that where the engine resides), such as to permit supervisory, configuration, maintenance, trouble-shooting, and logging functions as desired.

The rules engine of the present invention provides a great degree of flexibility, specifically by allowing more precise control of various operational and business-related parameters of the system on a dynamic basis. For example, in one aspect, the rules engine can be configured to selectively utilize different search engines and/or advertising servers under different circumstances. As an illustration, consider the case where viewers of a certain specific (or genre of) video clip generally have a lower "click though" rate or yield than those of other clips/types; e.g., sports clips (low yield) versus business/finance clips (high yield). The rules engine might allow the network operator (e.g., website operator or MSO) to allocate search requests based on metadata associated with this lower-rate clip to a less capable or lower-revenue yielding search engine/advertising server, since the operator or MSO would want to reserve the more capable or higher yield assets for clips with a higher click-through rate, especially where capacity for handling such requests was limited.

Alternatively, better quality results or performance may be obtained using one search engine versus another for particular topics, or where the metadata meets certain criteria. For example, it may be determined that metadata having a large percentage of more common search terms is better handled by one search engine (or type) as compared to another. Hence, the rules engine of the present invention allows such "intelligent" front-end analysis and selection.

Similarly, as previously noted, different types of search term generation may be utilized consistent with the present invention based on one or more operational or business/profitability metrics (such as click-through rate).

In another embodiment, the metadata can be analyzed by an indigenous or third-party algorithm in order to select or derive the best search terms for the particular context. For example, such an algorithm might develop frequency of occurrence statistics for each word in the metadata, such as by accessing a database with this information stored therein. The algorithm might then select the most unique words (i.e., those with the lowest frequency of historical use), and provide only these selected terms to the search engine, in effect focusing on the most distinctive terms to produce the most relevant results.

As another alternative, the algorithm might insert sets of Boolean quotation marks (i.e., "Term 1 . . . Term n") to form a string query, which tells the search engine to search for a specific sequence of terms versus merely there occurrence in any order or placement within the page being searched. For example, searching on the terms "space" and "shuttle" without such a string imposed might return less relevant results than if the terms were part of a string.

Additionally, the rules engine can select from different types or algorithms for back-end processing of the results returned from the advertising server or other secondary content source. For example, one simple algorithm filters all but a pre-designated number and/or type of "hits" returned, so as to assure the results fit within a given size display window areas, to permit easy viewing by the user, and/or to limit the number of choices they have. More sophisticated algorithms might analyze the HTML or other format in which the results are rendered to screen for redundancy, relevance, "blacklisted" advertisers or sites (e.g., those which are disreputable, carry adult content, etc.), inappropriate content, or other parameters.

Another analysis or filtration algorithm might select and re-order search results based on their historical profitability or other performance metric (e.g., "click-throughs"). For example, if the advertising server returns ten (10) results from a metadata-based query, the back-end processing algorithm might access a database of historical "profitability", revenue, click-throughs, etc. and evaluate each of the returned links on one or more selected metrics (e.g., click-throughs). The algorithm could then (i) rank the ten results based on this metric, and then (i) select only the top "n" results (e.g., top three or five) for display to the user.

Furthermore, the back-end processing algorithm (and for that matter, the secondary content source itself) can be configured to skew returned results to certain "premier" advertisers. This is to be distinguished from the foregoing selective ranking and filtration of the returned results; rather, in the present context, the primary metric by which returned results are ranked and selected is the membership or payment status of the advertiser. For example, the secondary content provider (e.g., Google AdServe) and/or the network operator (e.g., ISP or MSO) might have different classes or tiers of advertisers; higher tier advertisers would have their advertising links displayed (all else being equal) more frequently or at more desirable times than the lower tier members.

As yet another option, the foregoing parameters (e.g., the selected or derived search terms, selected search engine/databases, back-end processing, etc.) can be adjusted based on client device or user profile data. For example, certain types of secondary content may not be amenable to or optimized for running on very "thin" client devices such as hand-helds or cellular telephones. While a user's cellular telephone may be equipped with a traditional micro-browser (e.g., WAP-based or comparable), such micro-browsers are still quite limited in the content they can reliably and rapidly process. Hence, the back-end processing (or other parameters) can be controlled so as to filter or screen returned results for only those which are compatible with the platform requesting the content (as well as any interposed infrastructure). Consider the case, for example, where the foregoing cellular telephone user is provided and selects a link to download a large software application. At the comparatively lower bit rates afforded by the mobile device and infrastructure, the user might become very frustrated waiting for an extended period to download the application. Further, even if download is successful, the application may not run on the "thin" mobile device. These problems can be substantially circumvented by screening the returned results (and hence the user's options) before displaying them to the user.

In the context of specific user or subscriber profile data, such data may already be gathered and resident within the network for other purposes. For example, in the context of the exemplary HFC network of FIG. 2, user/subscriber profile data may be collected by client application(s) running on the subscriber's CPE 206, and either sent back upstream for use in selective delivery of content or targeting of advertisements (delivered via in-band channels such according to a VOD or switched digital broadcast (SDB) paradigm), or retained in situ at the CPE for use by indigenous applications. This data can comprise, without limitation, anecdotal or historical data on a given user's on-line or viewing behavior, such as a list of URLs or IP addresses which the user has accessed over a period of time. This information can be correlated (whether based on URL, IP address, or another metric such as a general category or content variable relating to the site residing at the URL/address) to results returned from the designated search entity, and this correlation (or lack thereof) being used as the basis for shaping the results presented to the user.

For example, where the user has a strong history of viewing URLs/sites relating to golf content, any results returned by the search entity for a given primary content (which may or may not be golf-related) can be screened against the historical data, and matching or similar entries given a higher rank or weighting for display to the user. In this fashion, the user is preferentially provided with links or advertisements that they are more likely to have an interest in, and which are related to the primary content being viewed. This is particularly useful since many people will tend to initiate viewing of primary content in which they have at least some interest, and likewise are likely to "surf" Internet sites which they also have an interest in. Hence, the present embodiment seeks to identify the nexus between these two populations (i.e., primary content the user tends to select, and URLs/sites the user tends to surf) in order to provide the most germane advertising or other secondary content.

Many other approaches and combinations are envisaged consistent with the invention, as will be recognized by those of ordinary skill when provided this disclosure.

Performance—

FIG. 7 illustrates exemplary anecdotal data obtained by the assignee hereof obtained during trial implementation of various aspects of the present invention in a commercial operating environment. As illustrated in FIG. 7, the performance of the primary content 702 having the contextually-related secondary content and display functions described herein was significantly higher than that of corresponding primary content 704 without the invention. In this case, performance was measured by both click-through rate (CTR) and revenue-per-mil (RPM), both of which showed substantial increases when the present invention was employed as compared to when not employed.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. In a content distribution network having a server and a consumer premises device in data communication therewith, a method of providing primary content and contextually-related secondary content to users of said network, said method comprising:

receiving at said server from said consumer premises device a request for said primary content for transmission or download;

accessing, in response to said act of receiving, a descriptive data file associated with said primary content, said descriptive data relating to at least one aspect of said primary content;

utilizing said descriptive data file to generate a multi-element search string;

providing said search string to a search entity for a search, if said search string comprises a search string known to said search entity, said search producing a known set of said contextually related secondary content which have been pre-screened to relate to the topic of said primary content;

transmitting said primary and secondary content to said consumer premises device; and displaying said primary and secondary content on a display device associated with said consumer premises device.

2. The method of claim 1, wherein said act of displaying comprises displaying said primary and secondary content in a common display window generated by a software application adapted for playing audiovisual content.

3. The method of claim 2, wherein:

said act of displaying further comprises displaying said secondary content immediately following the completion of the display of said primary content; and said secondary content comprises textual advertising data.

4. The method of claim 2, wherein said act of transmitting comprises:

disposing said primary and secondary content within a common data structure; and transmitting said common data structure to said consumer premises device.

5. The method of claim 4, wherein said network comprises a cable television network capable of video-on demand (VOD) delivery of content, and said act of transmitting comprises transmitting as part of a VOD session.

6. A method of providing encoded video content and contextually-related markup language advertising content to a plurality of user devices in data communication with at least one server via an Internet, said method comprising:

receiving a request for said encoded video content for download to at least one of said user devices;

in response to said act of receiving, downloading to said at least one user device a software application capable of running thereon and adapted to provide for a display of said encoded video content and markup language advertising content as a single uninterrupted and continuous stream so as to avoid disrupting the attention of a user of said at least one user device;

accessing a metadata file descriptive of one or more content-based attributes of said requested encoded video content;

processing said metadata file to derive one or more search terms;

providing said search terms to a third party advertising server having a search engine running thereon, said search terms being entered into a search of a plurality of available markup language advertising content, said search producing said contextually related advertising content;

receiving said contextually related markup language advertising content from said third party advertising server; and transmitting said requested encoded video content and said markup language advertising content to said at least one user device for display thereon via said software application;

wherein said software application is adapted to display said requested encoded video content and said markup language advertising content within a single display window generated by said software application; and wherein said processing of said metadata file reduces an instance of said search producing irrelevant or marginally relevant markup language advertising content.

* * * * *